United States Patent
Hagiwara et al.

(10) Patent No.: US 8,147,774 B2
(45) Date of Patent: Apr. 3, 2012

(54) MICRO PASSAGE CHIP AND FLUID TRANSFERRING METHOD

(75) Inventors: Hisashi Hagiwara, Sagamihara (JP); Yoshinori Mishina, Sagamihara (JP)

(73) Assignee: Aida Engineering, Ltd., Sagamihara-Shi (JP)

( * ) Notice: Subject to any disclaimer, the term of this patent is extended or adjusted under 35 U.S.C. 154(b) by 432 days.

(21) Appl. No.: 12/307,403

(22) PCT Filed: Jul. 4, 2007

(86) PCT No.: PCT/JP2007/063354
§ 371 (c)(1), (2), (4) Date: Jan. 5, 2009

(87) PCT Pub. No.: WO2008/004572
PCT Pub. Date: Jan. 10, 2008

(65) Prior Publication Data
US 2009/0202391 A1 Aug. 13, 2009

(30) Foreign Application Priority Data
Jul. 5, 2006 (JP) ................................. 2006-185537

(51) Int. Cl.
*B01L 3/00* (2006.01)
*B32B 3/00* (2006.01)
*F16K 17/40* (2006.01)
*F16K 3/00* (2006.01)
*F17D 1/00* (2006.01)
*G01N 33/00* (2006.01)
*F17D 1/16* (2006.01)
*G01L 27/00* (2006.01)
*G01F 19/00* (2006.01)

(52) U.S. Cl. ....... 422/502; 422/68.1; 422/503; 422/537; 428/172; 137/1; 137/2; 137/7; 137/14; 137/67; 73/1.57; 73/1.69; 73/1.73

(58) Field of Classification Search .................. None
See application file for complete search history.

(56) References Cited

U.S. PATENT DOCUMENTS
7,318,912 B2 * 1/2008 Pezzuto et al. ............... 422/504
(Continued)

FOREIGN PATENT DOCUMENTS
JP 2000027813 1/2000
(Continued)

*Primary Examiner* — Brian J Sines
*Assistant Examiner* — Jennifer Wecker
(74) *Attorney, Agent, or Firm* — McDermott Will & Emery LLP

(57) ABSTRACT

There is provided by the present invention a novel micro passage chip having such a structure that a fluid can be transferred without using a physical or mechanical squeezing means that is applied from above the substrate of the micro passage chip. The micro passage chip of the present invention comprises at least a first substrate, a second substrate, and an intermediate substrate interposed between the first substrate and the second substrate and is characterized in that a first non-adhesive thin-film layer is formed on at least one of the mating sides of the first substrate and the intermediate substrate and at least one port for fluids that is in contact with the first non-adhesive thin-film layer and which is open to the outer surface of the first substrate is provided in any position on the first non-adhesive thin-film layer, and that at least a portion of a second non-adhesive thin-film layer whose length is either the same as or different from that of the first non-adhesive thin-film layer is formed on at least one of the mating sides of the second substrate and the intermediate substrate such that it lies either above or under the first non-adhesive thin-film layer, with the intermediate substrate lying in between, and a pressurizing port that is in contact with the second non-adhesive thin-film layer and which is open to the outer surface of the first or the second substrate is provided in at least one area on the second non-adhesive thin-film layer.

10 Claims, 8 Drawing Sheets

U.S. PATENT DOCUMENTS

| | | | |
|---|---|---|---|
| 2002/0127736 A1* | 9/2002 | Chou et al. | 436/180 |
| 2003/0175162 A1* | 9/2003 | Anazawa et al. | 422/99 |
| 2004/0238052 A1* | 12/2004 | Karp et al. | 137/822 |

FOREIGN PATENT DOCUMENTS

| | | |
|---|---|---|
| JP | 2001157855 | 6/2001 |
| JP | 2002340911 | 11/2002 |
| JP | 2003107094 | 4/2003 |
| JP | 2003-130765 | 5/2003 |
| JP | 2004212361 | 7/2004 |
| JP | 2004291187 | 10/2004 |
| JP | 2005313065 | 11/2005 |
| JP | 3746207 B | 2/2006 |
| JP | 2006053064 | 2/2006 |
| JP | 3865134 B | 1/2007 |
| JP | 2007111668 | 5/2007 |
| JP | 3732159 B | 1/2008 |
| WO | WO-2004000721 | 12/2003 |
| WO | WO-2005069980 | 8/2005 |

* cited by examiner

FIG. 2
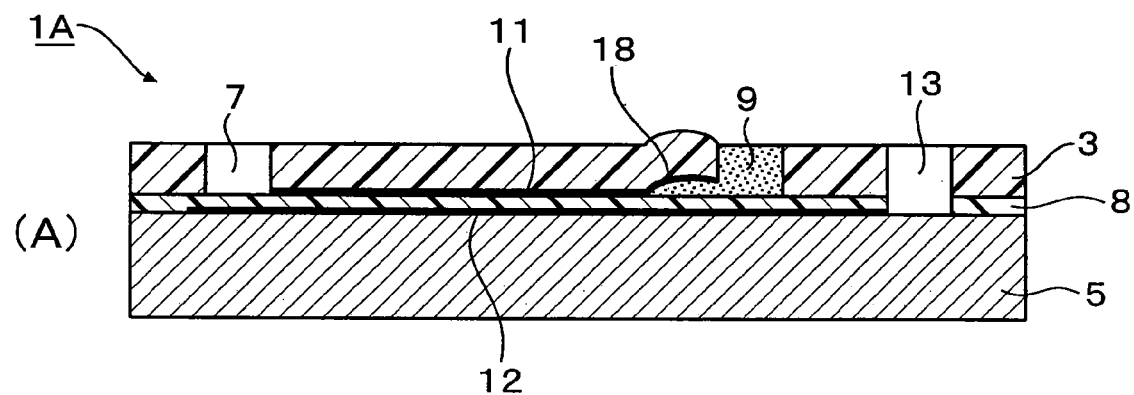
(A)
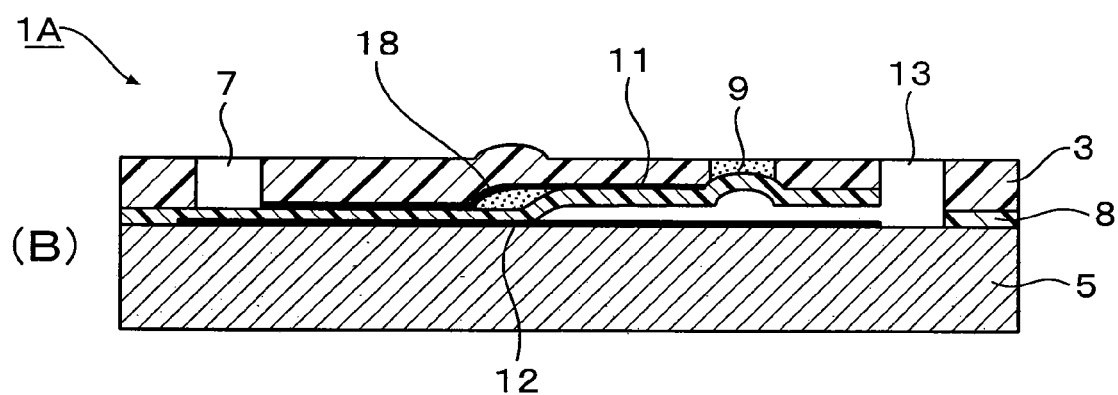
(B)
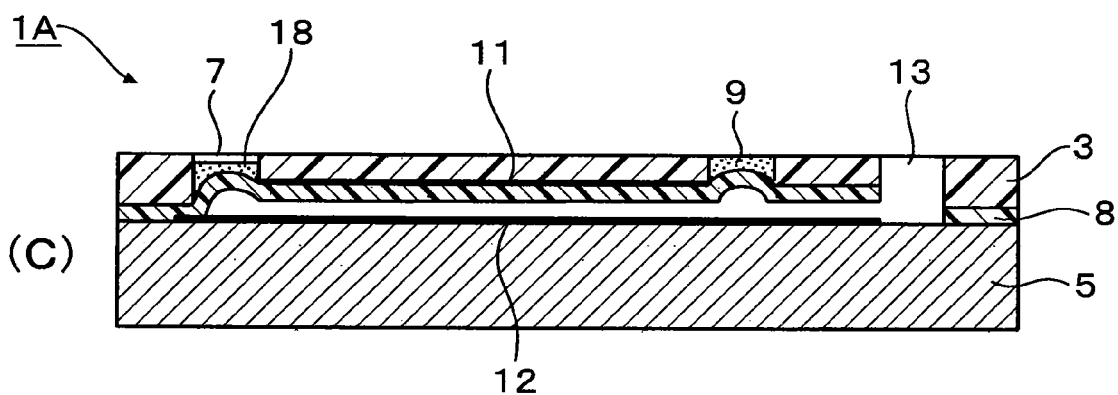
(C)

FIG. 3
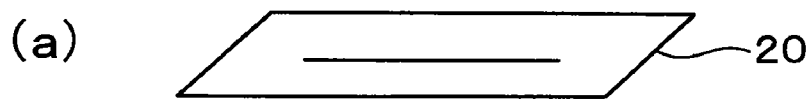
(a)
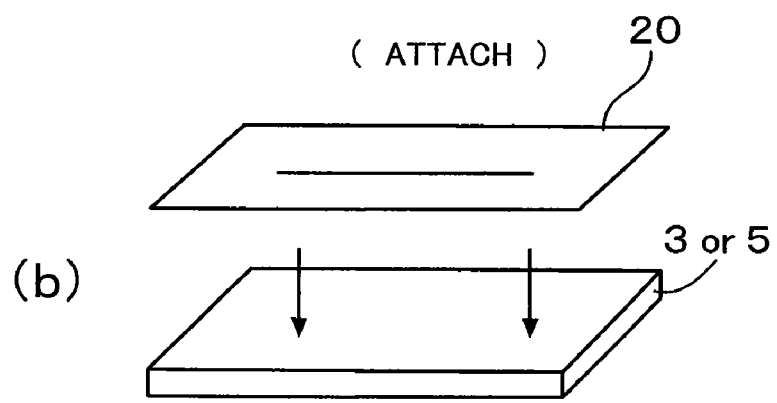
(b) (ATTACH)
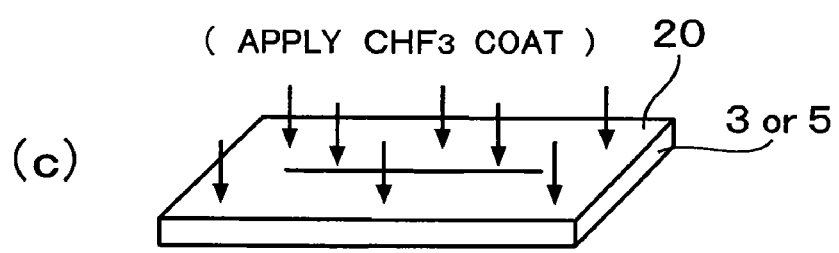
(c) (APPLY CHF3 COAT)
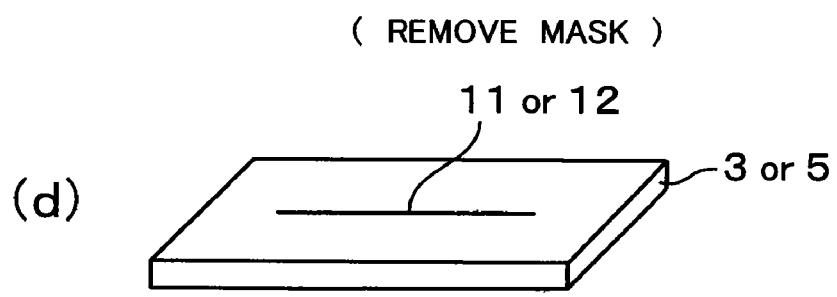
(d) (REMOVE MASK)

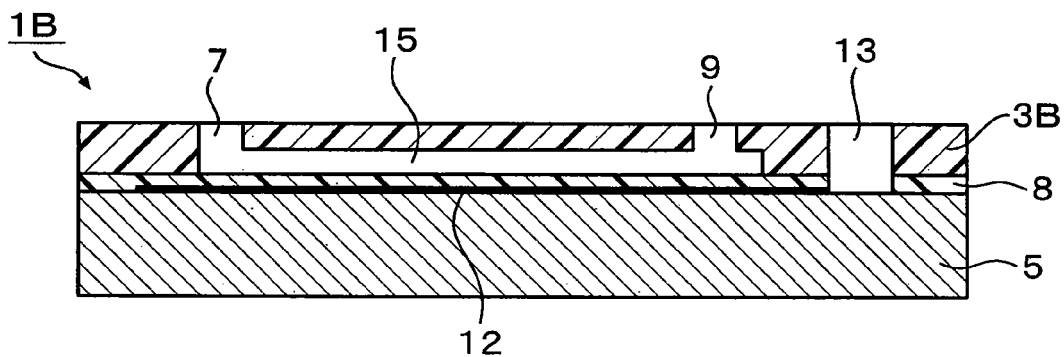
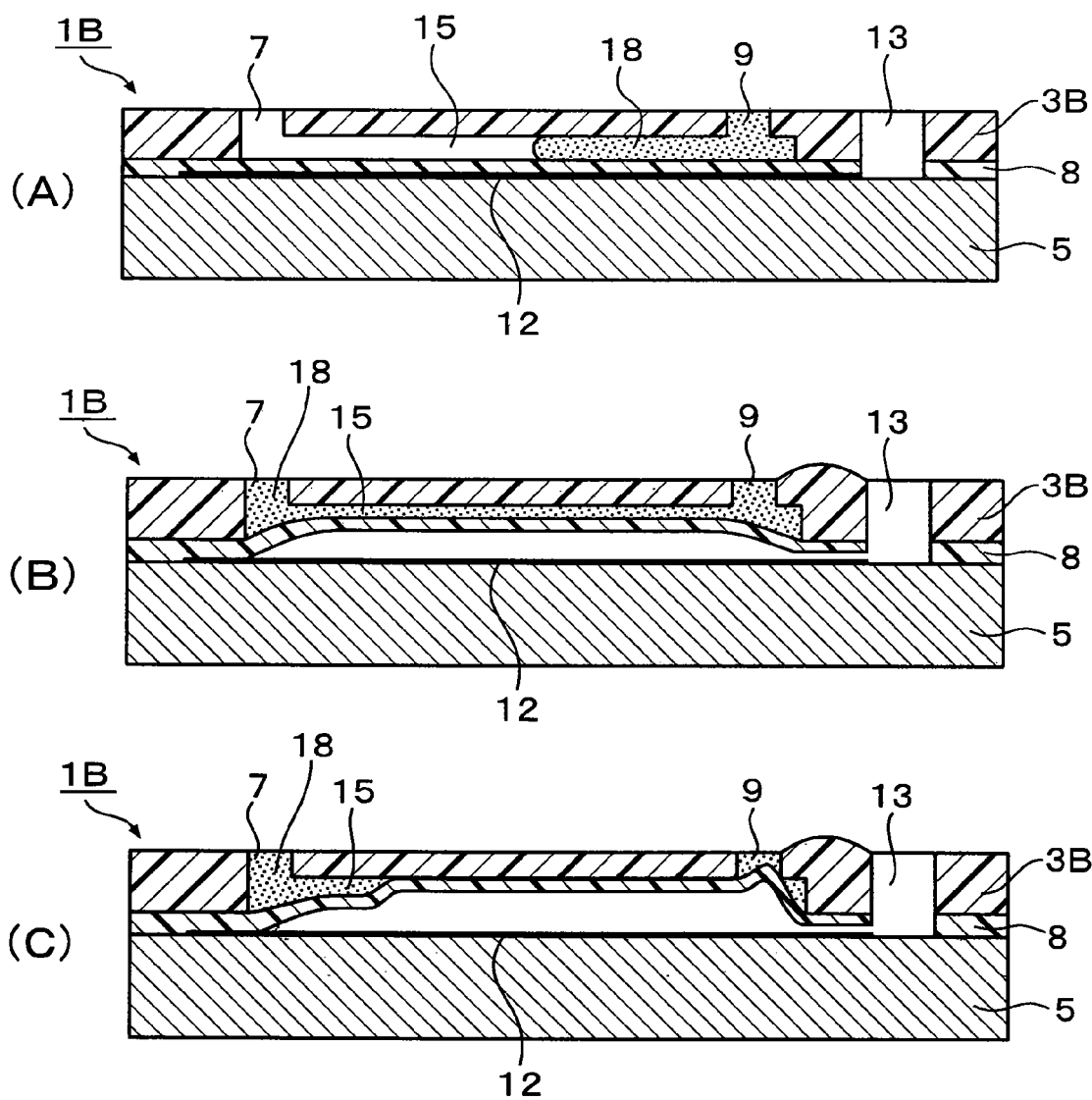

FIG. 9
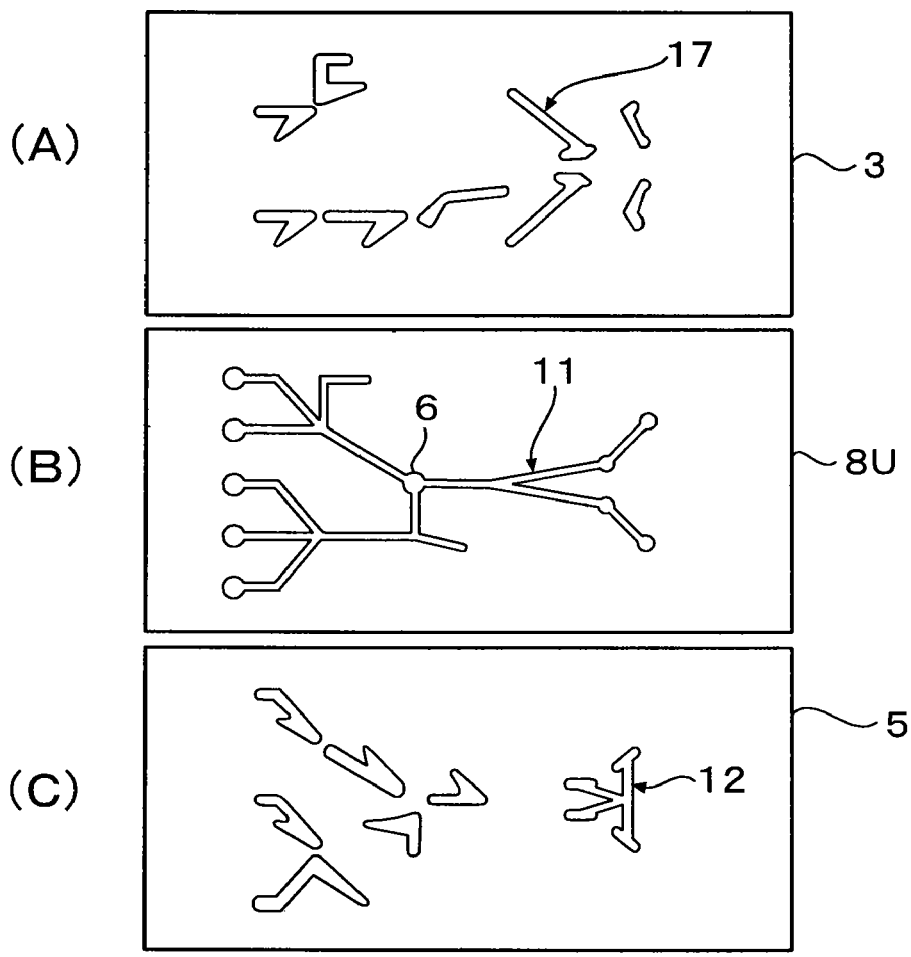
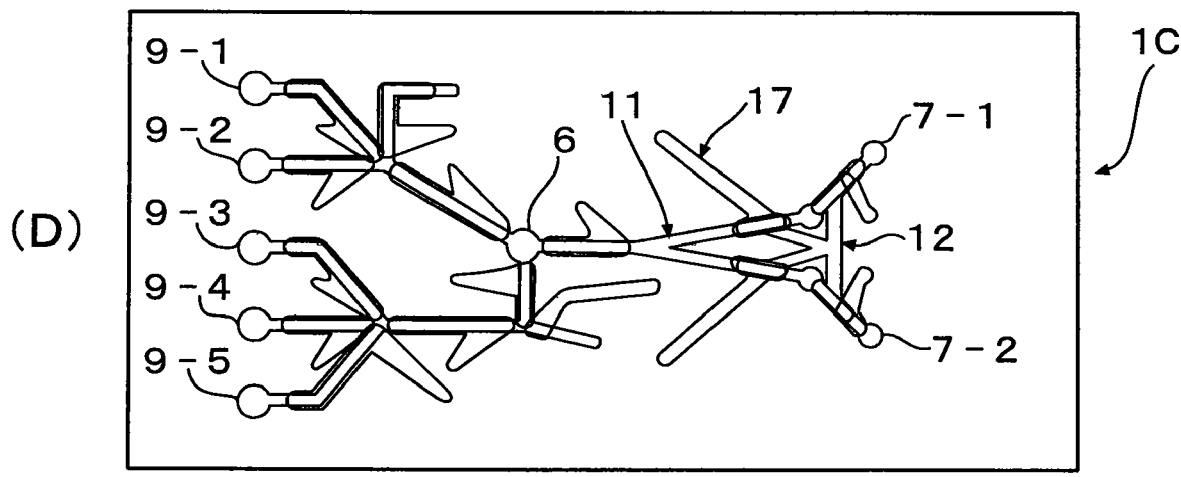

MICRO PASSAGE CHIP AND FLUID TRANSFERRING METHOD

CROSS-REFERENCE TO PRIOR APPLICATION

This is the U.S. National Phase Application under 35 U.S.C. §371 of International Patent Application No. PCT/JP2007/063354 filed Jul. 4, 2007, which claims the benefit of Japanese Patent Application No. 2006-185537, filed on Jul. 5, 2006, both of which are incorporated by reference herein. The International Application was published in Japanese on Jan. 10, 2008 as WO2008/004572 A1 under PCT Article 21(2).

TECHNICAL FIELD

The present invention relates to a micro passage chip that is extensively used in chemical/biochemical analyses such as gene analysis. More particularly, the present invention relates to a micro passage chip having a simple fluid transfer mechanism for transferring samples of fluids such as liquids or gases.

BACKGROUND ART

Devices commonly known as "micro-total analysis systems (µTAS)" or "lab-on-chip" comprise a substrate and microstructures such as micro-channels and ports that are provided in the substrate to form channels of specified shapes. It has recently been proposed that a variety of operations such as chemical reaction, synthesis, purification, extraction, generation and/or analysis be performed on substances in the microstructures, and some of the proposals have been commercialized. Structures that are fabricated for this purpose and which have microstructures such as micro-channels and ports provided in the substrate are collectively referred to as "micro-fluid devices" or "micro-channel chips".

Micro-channel chips find use not only in chemical, biochemical, pharmaceutical, medical and veterinary fields for gene analysis, clinical diagnosis, drug screening and the like but also in a wide range of applications including chemical engineering and environmental monitoring. Compared to devices of the same type in usual size, micro-channel chips have various advantages including (1) extremely smaller amounts of samples and reagents that need to be used, (2) shorter analysis time, (3) higher sensitivity, (4) portability to the site for on-site analysis, and (5) one-way use.

A conventional micro-channel chip is shown in FIGS. 10A and 10B, where it is indicated by numeral 100. As shown, the micro-channel chip 100 comprises an upper substrate 102 that is formed of a material such as a synthetic resin, at least one micro-channel 104 formed in the upper substrate 102, ports 105 and 106 formed in at least one end of the micro-channel 104 to serve as an input port and an output port, and a lower substrate 108 that is adhered to the lower side of the substrate 102 and which is formed of a transparent or opaque material (for example, glass or a synthetic resin film). The lower substrate 108 helps seal the bottoms of the ports 105 and 106, as well as the micro-channel 104. The materials and structures of micro-channel chips of the type shown in FIGS. 10A and 10B, as well as processes for producing them may be found in Patent Documents 1 and 2.

The micro-channels in the micro-channel chip, in order to transfer a fluid (mainly a liquid or gas such as a liquid chemical or sample) from one area to another, occasionally employs a physical or mechanical squeezing means that is applied from the outer surface of the substrate. For example, Patent Document 3 describes a fluid processing device comprising (a) a substrate fixing platform for fixing a substrate formed of an elastic polymeric material having a micro-channel formed in the interior, (b) a solid structure as a pressurizing means that applies pressure from the outside to a surface of the substrate, (c) a linear moving unit as a moving means that is linked to the solid structure or the substrate fixing platform and which moves such solid structure or substrate fixing platform in the longitudinal direction of the micro-channel, and (d) a section that descends the solid structure vertical to the substrate in order to apply pressure to the substrate.

In addition, Patent Document 4 describes a cartridge for biochips that comprises (a) a flat plate of substrate member that is formed of an elastic material and (b) a flexible cover of harder material than the substrate member that is mounted in contact with both the upper and lower surfaces of the substrate member, the substrate member having a sampling section for collecting a biopolymer and a pretreatment section that performs a pretreatment on the biopolymer; according to Patent Document 4, the cover is pressed down by a roll of rigid body for progressively moving the biopolymer from the sampling section toward the pretreatment section.

Furthermore, Patent Document 5 describes a micro-reactor of sheet type in the form of an assembly of flexible sheets that are superposed in intimate contact, which has in its interior (a) a first void section for holding an analyte, (b) a plurality of second void sections communicating with the first void section, and (c) a third void section that communicates with the second void sections and which holds a reagent to perform a chemical reaction with the analyte, further characterized in that a fixed member that serves as a shaft for causing rotation along the surface of the sheet assembly is provided on that surface of the side where the third void section is provided.

Further in addition, Patent Document 6 describes a cartridge for chemical reactions that comprises a vessel at least part of which is formed of an elastic material, the vessel having formed in it a plurality of compartments that are connected or arranged connectable by channels, further characterized in that by applying an external force to the elastic material from the outside of the vessel, a material either in the channel(s) or the compartment(s) or in both is moved to perform a chemical reaction, wherein either the channel(s) or the compartment(s) or both have a capacity of zero before the fluid material is flowed in. In the case of this cartridge, if the fluid material is flowed into the channel(s) and compartment (s), a roller is rolled over the cartridge so as to depress its outer surface, whereby the fluid material is moved in a specified direction.

The problem with the device of Patent Document 3 is that it is extremely difficult to maintain the positional precision while applying a mechanical pressure to the concave channel and no fluid transfer is possible if a positional mismatch occurs. The devices of Patent Documents 4 to 6 are effective for large spaces or channel structures of a simple orientation but they are incapable of complicated squeezing actions such as introducing a liquid chemical through four adjacent ports into the same reaction vessel at different times, or agitating the liquid chemical by reciprocating it at millisecond intervals, or transferring the liquid chemical from one channel to an adjacent channel that is apart by only a few millimeters. In addition, being a mechanical pressurizing means or a transfer means involving centrifugal force, those devices require a moving part, which makes it difficult to sufficiently reduce their size (that they become portable). As a further problem, the physical or mechanical squeezing means is slid over the substrate as it is depressed against the substrate's outer surface, so the substrate is often damaged making it necessary to perform another analysis.

Patent Document 1: Official gazette of JP 2000-27813 A
Patent Document 2: Official gazette of JP 2001-157855 A
Patent Document 3: Specification of Japanese Patent No. 3732159
Patent Document 4: Specification of Japanese Patent No. 3865134
Patent Document 5: Specification of Japanese Patent No. 3746207
Patent Document 6: Official gazette of JP 2005-313065 A

DISCLOSURE OF THE INVENTION

Problems to be Solved by the Invention

Therefore, an object of the present invention is to provide a novel micro passage chip having such a structure that a fluid can be transferred without using a physical or mechanical squeezing means that is applied from above the substrate of the micro passage chip.

Another object of the present invention is to provide a novel fluid transferring method using this micro passage chip.

Means for Solving the Problems

As one means for attaining the first-stated object, the invention according to claim 1 provides a micro passage chip comprising at least a first substrate, a second substrate, and an intermediate substrate interposed between the first substrate and the second substrate, wherein a first non-adhesive thin-film layer is formed on at least one of the mating sides of the first substrate and the intermediate substrate and at least one port for fluids that is in contact with the first non-adhesive thin-film layer and which is open to the outer surface of the first substrate is provided in any position on the first non-adhesive thin-film layer, and at least a portion of a second non-adhesive thin-film layer whose length is either the same as or different from that of the first non-adhesive thin-film layer is formed on at least one of the mating sides of the second substrate and the intermediate substrate such that it lies either above or under the first non-adhesive thin-film layer, with the intermediate substrate lying in between, and a pressurizing port that is in contact with the second non-adhesive thin-film layer and which is open to the outer surface of the first or the second substrate is provided in at least one area on the second non-adhesive thin-film layer.

According to this invention, the first substrate in the non-adhesive part corresponding to the first non-adhesive thin-film layer is first pressurized so that it inflates to create a gap into which a fluid is introduced and, subsequently, the intermediate substrate in the non-adhesive part corresponding to the second non-adhesive thin-film layer is caused to inflate, whereupon the fluid within the gap in the first substrate is squeezed by the inflating portion of the intermediate substrate to enable its transfer. Thus, by forming a simple three-layered structure, a squeezing action can be effected from within the chip. Since this eliminates the need to bring a physical or mechanical squeezing means into contact with the outer surface of the first substrate and to move it as it is pressed down, the fluid can be transferred without damaging the first substrate. Furthermore, with no physical or mechanical squeezing means being used, the whole size of the micro-channel chip device can be sufficiently reduced to make it portable.

As another means for attaining the first-stated object, the invention according to claim 2 provides a micro passage chip which is the same as recited in claim 1, provided that:

a first non-adhesive part is present in the area of the interface between the first substrate and the intermediate substrate where the first non-adhesive thin-film layer is formed;

a second non-adhesive part is present in the area of the interface between the second substrate and the intermediate substrate where the second non-adhesive thin-film layer is formed;

the first non-adhesive part serves as a channel for the fluid; and the second non-adhesive part serves as a squeezing means for transferring the fluid.

According to this invention, the presence of the non-adhesive part in the area where each of the non-adhesive thin-film layers is formed enables inflation by pressurization, allowing the fluid to be injected and transferred by squeezing.

As yet another means for attaining the first-stated object, the invention according to claim 3 provides a micro-channel chip which is the same as recited in claim 1, provided that the first non-adhesive thin-film layer includes, halfway down it, at least one enlarged region layer having at least one planar shape selected from the group consisting of a circular, an elliptical, a rectangular, and a polygonal shape.

According to this invention, the enlarged region layer in the first non-adhesive thin-film layer can function as a liquid reservoir or a reaction chamber, which can be utilized to perform PCR amplification and various other chemical, biochemical or physiological reactions. Therefore, by providing the first non-adhesive thin-film layer with at least one enlarged region layer, the scope of utilization of the micro-channel chip can be expanded.

As still another means for attaining the first-stated object, the invention according to claim 4 provides a micro passage chip which is the same as recited in any one of claims 1 to 3, provided that the first non-adhesive thin-film layer and the second non-adhesive thin-film layer each have a film thickness in the range of 10 nm to 300 µm and a width in the range of 10 µm to 3000 µm.

According to this invention, each of the non-adhesive thin-film layers is specified to have film thicknesses and widths that are suitable for transfer by squeezing in the micro-channel chip of the present invention.

As a further means for attaining the first-stated object, the invention according to claim 5 provides a micro passage chip comprising at least a first substrate, a second substrate, and an intermediate substrate interposed between the first substrate and the second substrate, wherein a hollow, concave channel through which to pass a fluid is formed on the side of the first substrate that is adhered to the intermediate substrate and at least one port for fluids that communicates with the concave channel and which is open to the outer surface of the first substrate is provided at any position in the concave channel, and at least a portion of a second non-adhesive thin-film layer whose length is either the same as or different from that of the concave channel is formed on at least one of the mating sides of the second substrate and the intermediate substrate such that it lies either above or under the concave channel, with the intermediate substrate lying in between, and a pressurizing port that is in contact with the second non-adhesive thin-film layer and which is open to the outer surface of the first or second substrate is provided in at least one area on the second non-adhesive thin-film layer.

According to this invention, there is provided a micro-channel chip in which a substrate having a concave channel that is formed by the prior art and which should serve as a fluid channel is combined with the transfer-by-squeeze means of the present invention. In addition, the fluid within the concave channel can be transferred positively without applying a physical or mechanical squeezing means from the outer surface of the first substrate and, what is more, the risk of damaging the first substrate can be eliminated.

As another means for attaining the first-stated object, the invention according to claim 6 provides a micro passage chip which is the same as recited in claim 5, provided that:

a second non-adhesive part is present in the area of the interface between the second substrate and the intermediate substrate where the second non-adhesive thin-film layer is formed; and the second non-adhesive part serves as a squeezing means for transferring the fluid.

According to this invention, the second non-adhesive part is present in the area where the second non-adhesive thin-film layer is formed, so by inflating the intermediate substrate in this second non-adhesive part, the fluid within the overlying concave channel can be transferred by squeezing.

As still another means for attaining the first-stated object, the invention according to claim 7 provides a micro passage chip which is the same as recited in claim 5 or 6, provided that the second non-adhesive thin-film layer has a film thickness in the range of 10 nm to 300 μm and a width in the range of 10 μm to 3000 μm.

According to this invention, the second non-adhesive thin-film layer is specified to have film thicknesses and widths that are suitable for transfer by squeezing in the micro-channel chip having the concave channel.

As yet another means for attaining the first-stated object, the invention according to claim 8 provides a micro passage chip comprising at least a first substrate, a second substrate, and a first and a second intermediate substrate that are interposed between the first substrate and the second substrate, wherein a first non-adhesive thin-film layer is formed on at least one of the mating sides of the first and the second intermediate substrate and at least one port for fluids that is in contact with the first non-adhesive thin-film layer and which is open to the outer surface of the first substrate is provided in any position on the first non-adhesive thin-film layer, at least a portion of a second non-adhesive thin-film layer whose length is either the same as or different from that of the first non-adhesive thin-film layer is formed on at least one of the mating sides of the second substrate and the second intermediate substrate such that it lies either above or under the first non-adhesive thin-film layer, with the second intermediate substrate lying in between, and a first pressurizing port that is in contact with the second non-adhesive thin-film layer and which is open to the outer surface of the first or the second substrate is provided in at least one area on the second non-adhesive thin-film layer, and at least a portion of a third non-adhesive thin-film layer whose length is either the same as or different from that of the first non-adhesive thin-film layer is formed on at least one of the mating sides of the first substrate and the first intermediate substrate such that it lies either above or under the first non-adhesive thin-film layer, with the first intermediate substrate lying in between, and a second pressurizing port that is in contact with the third non-adhesive thin-film layer and which is open to the outer surface of the first or the second substrate is provided in at least one area on the third non-adhesive thin-film layer.

According to this invention, a plurality of intermediate substrates are interposed and this enables the fluid to be transferred by squeezing in complicated ways, such as advancing, retracting, or stopping it.

As another means for attaining the first-stated object, the invention according to claim 9 provides a micro passage chip which is the same as recited in claim 8, provided that:

a first non-adhesive part is present in the area of the interface between the first and the second intermediate substrate where the first non-adhesive thin-film layer is formed;

a second non-adhesive part is present in the area of the interface between the second substrate and the second intermediate substrate where the second non-adhesive thin-film layer is formed;

a third non-adhesive part is present in the area of the interface between the first substrate and the first intermediate substrate where the third non-adhesive thin-film layer is formed;

the first non-adhesive part serves as a channel for the fluid; and the second and third non-adhesive parts serve as squeezing means for transferring the fluid.

According to this invention, the presence of the non-adhesive part in each of the areas where the respective non-adhesive thin-film layers are formed enables inflation by pressurization in complicated repertoire, allowing transfer by squeezing in various patterns.

As yet another means for attaining the first-stated object, the invention according to claim 10 provides a micro passage chip which is the same as recited in claim 8, provided that the first non-adhesive thin-film layer includes, halfway down it, at least one enlarged region layer having at least one planar shape selected from the group consisting of a circular, an elliptical, a rectangular, and a polygonal shape.

According to this invention, the enlarged region layer can function as a liquid reservoir or a reaction chamber, which can be utilized to perform PCR amplification and various other chemical, biochemical or physiological reactions. Therefore, by providing the first non-adhesive thin-film layer with at least one enlarged region layer, the scope of utilization of the micro-channel chip can be expanded.

As still another means for attaining the first-stated object, the invention according to claim 11 provides a micro passage chip which is the same as recited in any one of claims 8 to 10, provided that the first non-adhesive thin-film layer, the second non-adhesive thin-film layer, and the third non-adhesive thin-film layer each have a film thickness in the range of 10 nm to 300 μm and a width in the range of 10 μm to 3000 μm.

According to this invention, each of the three non-adhesive thin-film layers is specified to have film thicknesses and widths that are suitable for transfer by squeezing in the micro-channel chip of the present invention.

As yet another means for attaining the first-stated object, the invention according to claim 12 provides a micro passage chip which is the same as recited in any one of claims 1 to 11, provided that the first substrate is made of polydimethylsiloxane (PDMS), the second substrate is made of polydimethylsiloxane (PDMS) or glass, and the intermediate substrate(s) is(are) made of polydimethylsiloxane (PDMS).

According to this invention, PDMS bonds permanently to itself or to glass, so only those areas that correspond to the parts where the non-adhesive thin-film layers are formed can be left as non-adhesive parts while the other parts are permanently bonded.

As one means for attaining the second-stated object, the invention according to claim 13 provides a method of fluid transfer in a micro passage chip comprising at least a first substrate, a second substrate, and an intermediate substrate interposed between the first substrate and the second substrate, wherein a first non-adhesive thin-film layer is formed on at least one of the mating sides of the first substrate and the intermediate substrate and at least one port is open to the outer surface of the first substrate is provided in any position on the first non-adhesive thin-film layer, at least a portion of a second non-adhesive thin-film layer whose length is either the same as or different from that of the first non-adhesive thin-film layer is formed on at least one of the mating sides of the second substrate and the intermediate substrate such that it lies either above or under the first non-adhesive thin-film layer, with the intermediate substrate lying in between, and a pressurizing port that is in contact with the second non-adhesive thin-film layer and which is open to the outer surface of the first or the second substrate is provided in at least one area on the second non-adhesive thin-film layer, a first non-adhesive part is present in the area of the interface between the first substrate and the intermediate substrate where the first non-adhesive thin-film layer is formed, and a second non-adhesive part is present in the area of the interface between the second substrate and the intermediate substrate where the second non-adhesive thin-film layer is formed, further characterized by comprising:

(a) the step of injecting a fluid of interest under pressure through the port so that the first substrate in the first non-adhesive part that corresponds to the first non-adhesive thin-film layer is inflated to create a gap and introducing the fluid into that gap;

(b) the step of inflating, with pressure being applied through the pressurizing port, the intermediate substrate in the second non-adhesive part that corresponds to the second non-adhesive thin-film layer; and (c) the step of applying further pressure so that the gap created in the second non-adhesive part grows further, whereby the fluid within the gap created in the first non-adhesive part is squeezed by the gap created in the second non-adhesive part so that it is transferred to a desired area.

According to this invention, a squeezing action can be effected within the chip. Since this eliminates the need to bring a physical or mechanical squeezing means into contact with the outer surface of the first substrate and to move it as it is pressed down, the fluid can be transferred without damaging the first substrate.

As a further means for attaining the second-stated object, the invention according to claim 14 provides a method of fluid transfer in a micro passage chip comprising at least a first substrate, a second substrate, and an intermediate substrate interposed between the first substrate and the second substrate, wherein a hollow, concave channel through which to pass a fluid is formed on the side of the first substrate that is adhered to the intermediate substrate and at least one port for fluids that communicates with the concave channel and which is open to the outer surface of the first substrate is provided at any position in the concave channel, at least a portion of a second non-adhesive thin-film layer whose length is either the same as or different from that of the concave channel is formed on at least one of the mating sides of the second substrate and the intermediate substrate such that it lies either above or under the concave channel, with the intermediate substrate lying in between, and a pressurizing port that is in contact with the second non-adhesive thin-film layer and which is open to the outer surface of the first or second substrate is provided in at least one area on the second non-adhesive thin-film layer, and a second non-adhesive part is present in the area of the interface between the second substrate and the intermediate substrate where the second non-adhesive thin-film layer is formed, further characterized by comprising:

(a) the step of injecting a fluid of interest through the port that communicates with the concave channel so that it is introduced into the concave channel;

(b) the step of inflating, with pressure being applied through the pressurizing port in contact with the second non-adhesive thin-film layer, the intermediate substrate in the second non-adhesive part that corresponds to the second non-adhesive thin-film layer; and (c) further inflating the intermediate substrate in the second non-adhesive part that corresponds to the second non-adhesive thin-film layer so that it gets into the groove of the concave channel, whereby the fluid within the concave channel is transferred in a specified direction.

According to this invention, even a substrate having a concave channel that is formed by the prior art and which should serve as a fluid channel enables fluid transfer if it is combined with the transfer-by-squeeze means of the present invention.

As yet another means for attaining the second-stated object, the invention according to claim 15 provides a method of fluid transfer in a micro passage chip comprising at least a first substrate, a second substrate, and a first and a second intermediate substrate that are interposed between the first substrate and the second substrate, wherein a first non-adhesive thin-film layer is formed on at least one of the mating sides of the first and the second intermediate substrate and at least one port for fluids that is in contact with the first non-adhesive thin-film layer and which is open to the outer surface of the first substrate is provided in any position on the first non-adhesive thin-film layer, at least a portion of a second non-adhesive thin-film layer whose length is either the same as or different from that of the first non-adhesive thin-film layer is formed on at least one of the mating sides of the second substrate and the second intermediate substrate such that it lies either above or under the first non-adhesive thin-film layer, with the second intermediate substrate lying in between, and a first pressurizing port that is in contact with the second non-adhesive thin-film layer and which is open to the outer surface of the first or the second substrate is provided in at least one area on the second non-adhesive thin-film layer, at least a portion of a third non-adhesive thin-film layer whose length is either the same as or different from that of the first non-adhesive thin-film layer is formed on at least one of the mating sides of the first substrate and the first intermediate substrate such that it lies either above or under the first non-adhesive thin-film layer, with the first intermediate substrate lying in between, and a second pressurizing port that is in contact with the third non-adhesive thin-film layer and which is open to the outer surface of the first or the second substrate is provided in at least one area on the third non-adhesive thin-film layer, a first non-adhesive part is present in the area of the interface between the first and the second intermediate substrate where the first non-adhesive thin-film layer is formed, a second non-adhesive part is present in the area of the interface between the second substrate and the second intermediate substrate where the second non-adhesive thin-film layer is formed, and a third non-adhesive part is present in the area of the interface between the first substrate and the first intermediate substrate where the third non-adhesive thin-film layer is formed, further characterized by comprising:

(a) the step of injecting a fluid of interest under pressure through the port so that the first substrate in the first non-adhesive part that corresponds to the first non-adhesive thin-film layer is inflated to create a gap and introducing the fluid into that gap;

(b) the step of inflating, with pressure being applied through the first pressurizing port, the second intermediate substrate in the second non-adhesive part that corresponds to the second non-adhesive thin-film layer and/or inflating, with pressure being applied through the second pressurizing port, the first intermediate substrate in the third non-adhesive part that corresponds to the third non-adhesive thin-film layer; and (c) the step of further growing the gap created in the second non-adhesive part and/or further growing the gap created in the third non-adhesive part, whereby the fluid within the gap created in the first non-adhesive part is squeezed by the gap created in the second non-adhesive part and/or by the gap created in the third non-adhesive part so that it is transferred to a desired area.

According to this invention, a plurality of intermediate substrates are interposed and this enables the fluid to be transferred by squeezing in complicated ways, such as advancing, retracting, or stopping it.

EFFECTS OF THE INVENTION

According to the micro passage chip and fluid transferring method of the present invention, the conventional physical or mechanical squeezing means is not used on the outer surface of the substrate but the intermediate substrate(s) are simply inflated to enable a fluid to be transferred to an intended area. As a result, not only is the structure of the micro passage chip simplified but also the manufacturing cost is considerably reduced to realize great economy. Furthermore, according to the micro passage chip and fluid transferring method of the present invention, there occur no problems such as the entrance of air into the fluid being transferred or the generation of pulsating flows.

BRIEF DESCRIPTION OF THE DRAWINGS

FIG. 2 is a set of schematic sectional views showing the principle of the fluid transferring method of the present invention using the micro passage chip 1A shown in FIGS. 1A and 1B.

FIG. 3 is a flowchart illustrating an exemplary method of forming a non-adhesive thin-film layer that is used in the micro passage chip of the present invention.

FIG. 5 is an outline sectional view showing another embodiment of the micro passage chip used to implement the fluid transferring method of the present invention.

FIG. 6 is a set of outline sectional views showing the principle of transferring a fluid using the micro passage chip 1B shown in FIG. 5.

FIG. 9 is a set of plan views showing exemplary layouts of a first non-adhesive thin-film layer 11, a second non-adhesive thin-film layer 12, and a third non-adhesive thin-film layer 17 in the micro passage chip 1C shown in FIG. 7.

Figure 1A:
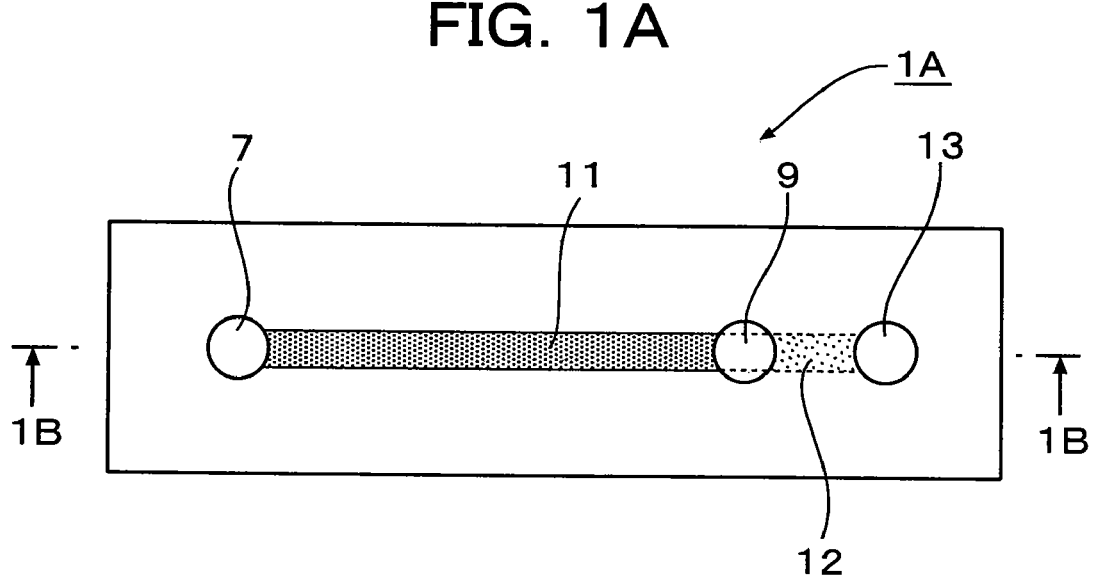
FIG. 1A is an outline transparent plan view showing an example of the micro passage chip used to implement the fluid transferring method of the present invention.

LEGEND 1A, 1B, 1C micro passage chip according to the present invention
3 upper substrate
5 lower substrate
6 enlarged region
7, 9 port
8 intermediate substrate
11 first non-adhesive thin-film layer (non-adhesive thin-film layer for a channel)
12 second non-adhesive thin-film layer (non-adhesive thin-film layer for squeezing)
13 pressurizing port
15 hollow, concave channel
17 third non-adhesive thin-film layer (non-adhesive thin-film layer for squeezing)
18 fluid (liquid)
19 pressurizing port
20 mask
100 conventional micro-channel chip
102 upper substrate
104 micro-channel
105, 106 port
108 lower substrate

BEST MODES FOR CARRYING OUT THE INVENTION

Figure 1B:
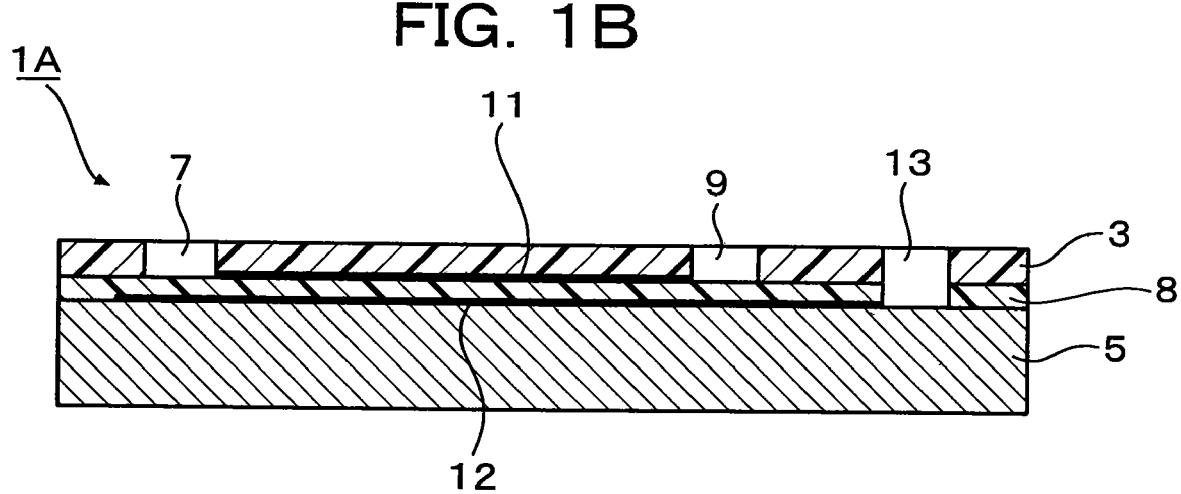
FIG. 1B is a sectional view taken through FIG. 1A along line 1B-1B.

FIG. 1A is an outline transparent plan view showing an example of the micro passage chip used to implement the fluid transferring method of the present invention and FIG. 1B is a sectional view taken through FIG. 1A along line 1B-1B. The micro passage chip 1A according to this embodiment comprises basically a first substrate 3, a second substrate 5, and an intermediate substrate 8 interposed between the first substrate 3 and the second substrate 5. In the illustrated micro passage chip 1A, the first substrate 3 is on the upper side and hence called "the upper substrate" whereas the second substrate 5 is on the lower side and hence called "the lower substrate" for the sake of convenience. Therefore, the relationship between the first (or second) substrate and the upper (or lower) substrate is arbitrary and by no means fixed.

The lower side of the upper substrate 3 is provided with a non-adhesive thin-film layer for a channel (a first non-adhesive thin-film layer) 11 in a specified area to cover a specified width and length. While the non-adhesive thin-film layer for a channel 11 is fastened to the lower side of the upper substrate 3, the interface between the non-adhesive thin-film layer for a channel 11 and the intermediate substrate 8 is maintained in a non-adhesive state. This non-adhesive part is called the first non-adhesive part. As will be described later in detail, the first non-adhesive part should serve as a channel for a fluid. One end of the non-adhesive thin-film layer for a channel 11 is connected to a port 7 and the other end to a port 9, both ports being open to the outer surface of the upper substrate 3. The ports are not limited to the illustrated mode where they are provided at opposite ends. Other possible modes are such that only one port is provided in an end portion of the non-adhesive thin-film layer for a channel 11 or that a plurality of ports are provided not only at opposite ends but also halfway of the non-adhesive thin-film layer for a channel 11. The port(s) are used as an inlet and an outlet of fluids such as a liquid or gas. In the present invention, the term "liquid" is used to have such a meaning that it covers all liquid phases including pure liquids as well as solutions, gels, sols, and semi-fluid phases. As will be described later in detail, when pressure is exerted through the port 7 or 9, that part of the upper substrate which corresponds to the first non-adhesive part at the interface between the non-adhesive thin-film layer for a channel 11 and the intermediate substrate 8 inflates to form a channel having a certain capacity. Thus, before the pressurization, the first non-adhesive part at the interface between the non-adhesive thin-film layer for a channel 11 and the intermediate substrate 8 has no capacity.

The upper side of the lower substrate 5 has a non-adhesive thin-film layer for squeezing 12 (a second non-adhesive thin-film layer) provided in a specified area to cover a specified width and length. While the non-adhesive thin-film layer for squeezing 12 is fastened to the upper side of the lower substrate 5, the interface between the non-adhesive thin-film layer for squeezing 12 and the intermediate substrate 8 is maintained in a non-adhesive state. This non-adhesive part is called the second non-adhesive part. As will be described later in detail, the second non-adhesive part should serve as a squeezing means for transferring a fluid. One end of the non-adhesive thin-film layer for squeezing 12 is connected to a pressurizing port 13 that is open to the outer surface of the upper substrate 3. The pressurizing port 13 may be provided in such a way that it is open to the outer surface of the lower substrate 5. If desired, the pressurizing port 13 may be provided halfway, rather than in an end portion, of the non-adhesive thin-film layer for squeezing 12. The non-adhesive thin-film layer for squeezing 12 may be as long as the non-adhesive thin-film layer for a channel 11 or it may be shorter or longer than the latter. Thus, the length of the non-adhesive thin-film layer for squeezing 12 may be selected as appropriate for its use. What is important in the present invention is that the non-adhesive thin-film layer for squeezing 12 should be provided in such a way that it lies either above or under the non-adhesive thin-film layer for a channel 11, with the intermediate substrate 8 lying in between. Unless the non-adhesive thin-film layer for squeezing 12 is provided in such a way that it lies either above or under the non-adhesive thin-film layer for a channel 11, with the intermediate substrate 8 lying in between, the intermediate substrate 8 in the area that corresponds to the second non-adhesive part in the area where the non-adhesive thin-film layer for squeezing 12 is present will not be able to inflate to perform the transfer-by-squeeze function; for details, see below. Other possible modes are such that the entire portion of the non-adhesive thin-film layer for squeezing 12 lies either above or under the non-adhesive thin-film layer for a channel 11 or that only a portion of the non-adhesive thin-film layer for squeezing 12 lies either above or under the non-adhesive thin-film layer for a channel 11. When pressure is exerted through the pressurizing port 13, that part of the intermediate substrate 8 which corresponds to the second non-adhesive part at the interface between the non-adhesive thin-film layer for squeezing 12 and the intermediate substrate inflates to form a space having a certain capacity, but before the pressurization, the second non-adhesive part at the interface between the non-adhesive thin-film layer for squeezing 12 and the intermediate substrate 8 has no capacity.

FIG. 2 is a set of schematic sectional views showing the principle of the fluid transferring method of the present invention using the micro passage chip 1A shown in FIGS. 1A and 1B. Reference is first made to FIG. 2A. Suppose a fluid of interest (say, a liquid 18) is injected through the port 9. The method and means of injection are not limited in any particular way. Methods and means of injection under pressure that are known to and conventionally used by skilled artisans can be appropriately chosen for use. By injecting the liquid 18, that part of the upper substrate which corresponds to the first non-adhesive part at the interface between the non-adhesive thin-film layer for a channel 11 and the intermediate substrate 8 inflates to form a gap having a certain capacity and, as a result, an appropriate amount of the liquid 18 is accommodated in the gap. Reference is next made to FIG. 2B. Using a tool such as a syringe (not shown), a pressurizing fluid is forced in through the pressurizing port 13. What can be utilized as the pressurizing fluid is selected from among a variety of gases such as air, a variety of liquids such as water, and a variety of oils such as mineral oils. The pressurizing fluid gets into the second non-adhesive part between the lower side of the intermediate substrate 8 and the non-adhesive thin-film layer for squeezing 12 on the upper side of the lower substrate 5, whereby the intermediate substrate 8 inflates. As the inflating nose of the intermediate substrate 8 advances, the liquid 18 that is closer to the port 9 is squeezed and transferred toward the port 7. Finally, reference is made to FIG. 2C. As the pressurizing fluid is kept forced in, the inflating nose of the intermediate substrate 8 eventually reaches the port 7, whereupon the liquid 18 is completely squeezed so that it can be transferred to the port 7 which is the intended area. This procedure may be utilized, for example, in the case where the product of PCR amplification of a DNA sample is transferred to a different step of analysis. In addition, by repeating the steps shown in FIGS. 2A to 2C, a specified amount of the liquid 18 can be transferred to the port 7. Except in the area where the non-adhesive thin-film layer for a channel 11 is present, the upper substrate 3 is adhered to the intermediate substrate 8, so the liquid 18 will not diffuse to the interface between the upper substrate 3 and the intermediate substrate 8 in any areas other than where the non-adhesive thin-film layer for a channel 11 is present.

The non-adhesive thin-film layer 11 and/or the non-adhesive thin-film layer 12 in the micro passage chip to be used in the present invention may be exemplified by the following that can be formed by known conventional techniques of chemical thin film formation: electrode film, dielectric protective film, semiconductor film, transparent conductive film, fluorescent film, superconductive film, dielectric film, solar cell film, anti-reflective film, wear-resistant film, optical interfering film, reflective film, antistatic film, conductive film, anti-fouling film, hard coating film, barrier film, electromagnetic wave shielding film, IR shield film, UV absorption film, lubricating film, shape-memory film, magnetic recording film, light-emitting device film, biocompatible film, corrosion-resistant film, catalytic film, gas sensor film, etc.

The chemical thin-film forming means for forming the non-adhesive thin-film layer 11 and/or the non-adhesive thin-film layer 12 may be exemplified by the method of forming a thin film with an apparatus for plasma discharge treatment, preferably using a organofluorine compound or a metal compound as the reactive gas.

Exemplary organofluorine compounds that can be used in this thin-film forming method include: fluorocarbon compounds such as methane fluorides (e.g., fluoromethane, difluoromethane, trifluoromethane, and tetrafluoromethane), ethane fluorides (e.g., hexafluoroethane), 1,1,2,2-tetrafluoroethylene, 1,1,1,2,3,3-hexafluoropropane, hexafluoropropane, and 6-fluoropropylene; fluorohydrocarbon compounds such as 1,1-difluoroethylene, 1,1,1,2-tetrafluoroethane, and 1,1,2,2,3-pentafluoropropane; chlorofluorohydrocarbon compounds such as difluorodichloromethane and trifluorochloromethane; fluoroalcohols such as 1,1,1,3,3,3-hexafluoro-2-propanol, 1,3-difluoro-2-propanol, and perfluorobutanol; fluorocarboxylate esters such as vinyl trifluoroacetate and 1,1,1-trifluoroacetate; and ketone fluorides such as acetyl fluoride, hexafluoroacetone, and 1,1,1-trifluoroacetone. Trifluoromethane is preferred.

Exemplary metal compounds that can be used in this thin-film forming method include elementary or alloyed metal compounds or organometallic compounds of Al, As, Au, B, Bi, Ca, Cd, Cr, Co, Cu, Fe, Ga, Ge, Hg, In, Li, Mg, Mn, Mo, Na, Ni, Pb, Pt, Rh, Sb, Se, Si, Sn, Ti, V, W, Y, Zn, Zr, etc.

Another chemical film forming technique that may be employed is the formation of a dense film by the sol-gel method and examples of the metal compounds that are preferred for use in this method include elementary or alloyed metal compounds or organometallic compounds of Al, As, Au, B, Bi, Ca, Cd, Cr, Co, Cu, Fe, Ga, Ge, Hg, In, Li, Mg, Mn, Mo, Na, Ni, Pb, Pt, Rh, Sb, Se, Si, Sn, Ti, V, W, Y, Zn, Zr, etc.

The non-adhesive thin-film layer 11 and/or the non-adhesive thin-film layer 12 can also be formed by methods other than those mentioned above. For instance, the non-adhesive thin-film layer 11 can be formed on the lower side of the upper substrate 3 and the non-adhesive thin-film layer 12 on the upper side of the lower substrate 5 by printing. Printing can be done by adopting a variety of known and conventional printing methods, including roll printing, silk printing, pattern printing, decalcomania, electrostatic duplication, and the like. If the non-adhesive thin-film layer 11 and/or the non-adhesive thin-film layer 12 is to be formed by printing techniques, various materials can advantageously be used to form the non-adhesive thin-film layer 11 and/or the non-adhesive thin-film layer 12 and they include: fine metal particles (for example, the fine particles of elementary metals or alloys thereof as selected from among Al, As, Au, B, Bi, Ca, Cd, Cr, Co, Cu, Fe, Ga, Ge, Hg, In, Li, Mg, Mn, Mo, Na, Ni, Pb, Pt, Rh, Sb, Se, Si, Sn, Ti, V, W, Y, Zn, Zr, etc. or the fine particles of oxides of these elementary metals or alloys thereof (e.g. fine ITO particles), and the fine particles of organometallic compounds of these metals), conductive ink, insulated ink, fine carbon particles, silanizing agent, parylene, coatings, pigments, dyes, water-based dye ink, water-based pigment ink, oil-based dye ink, oil-based pigment ink, solvent-based ink, solid ink, gel ink, polymer ink, and the like.

Alternatively, the non-adhesive thin-film layer 11 and/or the non-adhesive thin-film layer 12 can be formed by a spray coating technique. For example, a coating agent may be sprayed from above a mask having a specified channel pattern and then dried to form the non-adhesive thin-film layer 11 on the lower side of the upper substrate 3 and the non-adhesive thin-film layer 12 on the upper side of the lower substrate 5. For example, materials capable of forming coats such as an electrode coat, a dielectric protective coat, a semiconductor coat, a conductive coat, a fluorescent coat, a superconductive coat, a dielectric coat, an anti-reflective coat, a wear-resistant coat, an optical interfering coat, a reflective coat, an antistatic coat, an anti-fouling coat, a hard coat, a barrier coat, an electromagnetic wave shielding coat, an IR shield coat, an UV absorption coat, a lubricating coat, a light-emitting device coat, a biocompatible coat, a corrosion-resistant coat, a catalytic coat, a metal coat, a glass coat, a paint coat, a water-repellant coat, a hydrophilic coat, a resin coat, a rubber coat, a synthetic fiber coat, a synthetic resin coat, a phospholipid coat, a coat formed by organism-derived materials, a biomaterial adhesion preventing coat, a lipid coat, an oil coat, a silane compound coat, a silazane compound coat, and an adhesive coat, may be dissolved or suspended in suitable solvents, with the resulting solution or suspension being sprayed as a coating agent. The water-repellant coat using a silicone acrylic resin based water repellant is preferred.

The film thickness of the non-adhesive thin-film layer 11 and/or the non-adhesive thin-film layer 12 varies with the thin-film forming method employed and it is generally preferred to lie within the range from 10 nm to 300 µm. If the film thickness of the non-adhesive thin-film layer 11 and/or the non-adhesive thin-film layer 12 is less than 10 nm, these thin-film layers will not be formed uniformly but both adhesive and non-adhesive sites will be scattered about as islands, making it difficult to attain the intended objects of the present invention. If, on the other hand, the film thickness of the non-adhesive thin-film layer 11 and/or the non-adhesive thin-film layer 12 is greater than 300 µm, not only is the non-adhering effect saturated but due to the excessive thickness of these layers, two adjacent substrates also come apart at the border to the non-adhesive thin-film layer 11 or 12 and fail to be bonded effectively. This causes undesirable inconveniences such as the failure to maintain the exact width of the non-adhesive thin-film layer 11 and/or the non-adhesive thin-film layer 12. If the chemical thin-film forming method is used, the film thickness of the non-adhesive thin-film layer 11 is generally within the range from 10 nm to 10 µm, preferably within the range from 30 nm to 5 µm, more preferably within the range from 50 nm to 3 µm. If the spray coating method is used, the film thickness of the non-adhesive thin-film layer 11 is generally within the range from 50 nm to 300 µm, preferably within the range from 80 µm to 200 µm, more preferably within the range from 100 nm to 100 µm. If the printing method is used, the film thickness of the non-adhesive thin-film layer 11 is generally within the range from 500 nm to 100 µm, preferably within the range from 800 nm to 80 µm, more preferably within the range from 1 µm to 50 µm.

The width of the non-adhesive thin-film layer 11 and/or the non-adhesive thin-film layer 12 may generally be the same as or greater or even smaller than the width of the micro-channel in the conventional micro-channel chip. Generally, the non-adhesive thin-film layer 11 and/or the non-adhesive thin-film layer 12 has a width ranging from about 10 µm to about 3000 µm. If the width of the non-adhesive thin-film layer 11 and/or the non-adhesive thin-film layer 12 is less than 10 µm, such a high pressure must be exerted to inflate the non-adhesive part that the micro-channel chip 1 itself might be destroyed. If, on the other hand, the width of the non-adhesive thin-film layer 11 and/or the non-adhesive thin-film layer 12 exceeds 3000 µm, undesirable excessive saturation will occur although the micro-channel chip is inherently intended to transport and control very small amounts of liquid or gas and perform chemical reaction, synthesis, purification, extraction, generation and/or analysis on substances. It is generally preferred that the non-adhesive thin-film layer 12 is wider than the non-adhesive thin-film layer 11. The greater the width, the higher the pressure that can be applied and this allows for positive transfer by squeezing.

The pattern itself of the non-adhesive thin-film layer for a channel 11 is by no means limited to the illustrated linear form. In consideration of the object and/or use, the non-adhesive thin-film layer 11 in Y-shaped, L-shaped, S-shaped, X-shaped or various other patterns may be adopted. In addition to the linear portion, the non-adhesive thin-film layer 11 may also have an enlarged region in any planar shape, such as a circular, an elliptical, a rectangular, or a polygonal shape. The enlarged region can function as a liquid reservoir upon inflating; this liquid reservoir portion may be utilized to ensure efficient performance of PCR amplification and other operations.

The pattern itself of the non-adhesive thin-film layer for squeezing 12 is by no means limited to the illustrated rectangular linear form. Depending on the shape of the non-adhesive thin-film layer for a channel 11 that is superposed on it, with the intermediate substrate 8 lying in between, any other pattern such as a streamlined, a diamond-like or a polygonal shape may be adopted. In addition, the pattern of the non-adhesive thin-film layer for squeezing 12 suffices to overlap with at least a portion of the pattern of the overlying non-adhesive thin-film layer for a channel 11 and the two patterns do not necessarily overlap in all parts. In short, the overlap may be in the necessary and sufficient amount that can attain the intended transfer by squeezing.

The upper substrate 3 of the micro passage chip 1 that is used in the present invention is preferably made of an elastic and/or flexible polymer or elastomer. If the upper substrate 3 is not formed of an elastic and/or flexible material, it becomes either impossible or difficult to ensure that the part of the upper substrate 3 which corresponds to the non-adhesive thin-film layer for a micro-channel 11 is sufficiently deformed to create a micro-channel of the type found in the conventional micro-channel chip. Hence, preferred materials of which the upper substrate 3 can be formed include not only silicone rubbers such as polydimethylsiloxane (PDMS) but also the following: nitrile rubber, hydrogenated nitrile rubber, fluorinated rubber, ethylene-propylene rubber, chloroprene rubber, acrylic rubber, butyl rubber, urethane rubber, chlorosulfonated polyethylene rubber, epichlorohydrin rubber, natural rubber, isoprene rubber, styrene-butadiene rubber, butadiene rubber, polysulfide rubber, norbornene rubber, and thermoplastic elastomers. Silicone rubbers such as polydimethylsiloxane (PDMS) are particularly preferred.

It is generally preferred that the thickness of the upper substrate 3 is within the range from 10 μm to 5 mm. If the thickness of the upper substrate 3 is less than 10 μm, even a low pressure is sufficient for creating a micro passage by inflating that part of the upper substrate 3 which corresponds to the non-adhesive thin-film layer 11 but, on the other hand, there is a high likelihood for the upper substrate 3 to rupture. If the thickness of the upper substrate 3 exceeds 5 mm, an undesirably high pressure must be exerted to create a micro-channel by inflating that part of the upper substrate 3 which corresponds to the non-adhesive thin-film layer 11.

The intermediate substrate 8 of the micro-channel chip 1A that is used in the present invention is preferably made of an elastic and/or flexible polymer or elastomer. If the intermediate substrate 8 is not formed of an elastic and/or flexible material, it becomes either impossible or difficult to ensure that the part of the intermediate substrate 8 which corresponds to the non-adhesive thin-film layer for squeezing 12 is sufficiently deformed to inflate and realize transfer by squeezing. Hence, preferred materials of which the intermediate substrate 8 can be formed include not only silicone rubbers such as polydimethylsiloxane (PDMS) but also the following: nitrile rubber, hydrogenated nitrile rubber, fluorinated rubber, ethylene-propylene rubber, chloroprene rubber, acrylic rubber, butyl rubber, urethane rubber, chlorosulfonated polyethylene rubber, epichlorohydrin rubber, natural rubber, isoprene rubber, styrene-butadiene rubber, butadiene rubber, polysulfide rubber, norbornene rubber, and thermoplastic elastomers. Silicone rubbers such as polydimethylsiloxane (PDMS) are particularly preferred. If the upper substrate 3 is formed of PDMS, it is preferred that the intermediate substrate 8 is also formed of PDMS. Two members of PDMS can be adhered strongly to each other without using any adhesive. This phenomenon is generally called "permanent bonding." The term permanent bonding as used herein refers to such a property that two substrates containing Si as a component that constitute them can be adhered to each other without using an adhesive but by just performing a certain kind of surface modification; this property contributes to exhibiting an effective seal on micro-structures in micro-channel chips. In the permanent bonding of PDMS substrates, their mating surfaces are subjected to an appropriate treatment for surface modification and then the two substrates are superposed, with the mating surfaces of the two substrates placed in intimate contact with each other, and the assembly is left to stand for a certain period of time, whereupon the two substrates can be easily adhered together. In other words, those parts of the substrates where the non-adhesive thin-film layer 11 is present are not permanently bonded but are maintained in a non-adhesive state, so upon application of pressure or the like, they can be inflated to deform into a balloon-like shape, thereby creating a gap for a channel. Since the parts of the substrates other than where the non-adhesive thin-film layer 11 is present are permanently bonded, the liquid or gas that is passed through the inflated portion will not leak to any other sites.

It is generally preferred that the thickness of the intermediate substrate 8 is within the range from 10 μm to 500 μm. If the thickness of the intermediate substrate 8 is less than 10 μm, even a low pressure is sufficient to provide ease in inflating the second non-adhesive part which corresponds to the non-adhesive thin-film layer 12 but, on the other hand, there is a high likelihood for the intermediate substrate 8 to rupture. If the thickness of the intermediate substrate 8 exceeds 500 μm, an undesirably high pressure must be exerted to inflate the second non-adhesive part which corresponds to the non-adhesive thin-film layer 12.

The lower substrate 5 of the micro passage chip according to the present invention has no particular need to be elastic and/or flexible but it is preferred to be capable of strong adhesion to the intermediate substrate 8. Suppose the intermediate substrate 8 is made of polydimethylsiloxane (PDMS); if the lower substrate 5 is made of PDMS or glass, the intermediate substrate 8 and the lower substrate 5 can be permanently bonded to each other without using an adhesive. Thus, those parts of the substrates where the non-adhesive thin-film layer 12 is present are not permanently bonded but are maintained in a non-adhesive state, so upon application of pressure or the like, they can be inflated to deform into a balloon-like shape, thereby creating a gap for squeezing. Since the parts of the substrates other than those where the non-adhesive thin-film layer 12 is present are permanently bonded, the liquid or gas that is passed through the inflated portions will not leak to any other sites. As long as it can be adhered to the intermediate substrate 8 to provide a bond that withstands the inflating pressure, the lower substrate 5 that is made of materials other than PDMS and glass can of course be used. Examples of such lower substrate include cellulose ester substrates, polyester substrates, polycarbonate substrates, polystyrene substrates, polyolefin substrates, etc.; specific examples of suitable materials include poly(ethylene terephthalate), poly(ethylene naphthalate), polyethylene, polypropylene, cellophane, cellulose diacetate, cellulose acetate butyrate, cellulose acetate propionate, cellulose acetate phthalate, cellulose triacetate, cellulose nitrate, poly (vinylidene chloride), poly(vinyl alcohol), ethylene-vinyl alcohol, polycarbonate, norbornene resin, poly(methylpentene), polyetherketone, polyimide, polyethersulfone, poly(etherketone imide), polyamide, fluoropolymer, nylon, poly(methyl methacrylate), acrylics, polyarylate, etc. Other materials that can be used to form the lower substrate 5 include poly(lactic acid) resins, poly(butylene succinate), nitrile rubber, hydrogenated nitrile rubber, fluorinated rubber, ethylene-propylene rubber, chloroprene rubber, acrylic rubber, butyl rubber, urethane rubber, chlorosulfonated polyethylene rubber, epichlorohydrin rubber, natural rubber, isoprene rubber, styrene-butadiene rubber, butadiene rubber, polysulfide rubber, norbornene rubber, and thermoplastic elastomers. These materials can be used either alone or in suitable admixture.

If these materials are not capable of permanent bonding by themselves, their surfaces to be adhered to the intermediate substrate 8 are subjected to such a surface treatment that they can be permanently bonded. Preferred agents that can be used in this surface treatment are silicon compounds and titanium compounds and specific examples include: alkyl silanes such as dimethylsilane, tetramethylsilane, and tetraethylsilane; organosilicon compounds such as tetramethoxysilane, tetraethoxysilane, tetrapropoxysilane, dimethyldiethoxysilane, methyltrimethoxysilane, and ethyltriethoxysilane; silicon hydride compounds such as monosilane and disilane; silicon halide compounds such as dichlorosilane, trichlorosilane, and tetrachlorosilane; silazanes such as hexamethyldisilazane; and silicon compounds having functional groups introduced therein, as exemplified by vinyl, epoxy, styryl, methacryloxy, acryloxy, amino, ureido, chloropropyl, mercapto, sulfide, and isocyanate.

It is generally preferred that the thickness of the lower substrate 5 is within the range from 300 μm to 10 mm. If the thickness of the lower substrate is less than 300 μm, it becomes difficult to maintain the overall mechanical strength of the micro passage chip. If, on the other hand, the thickness of the lower substrate 5 exceeds 10 mm, the mechanical strength required of the micro-channel chip is saturated and only diseconomy results.

FIG. 3 is a flowchart illustrating an exemplary method of forming a non-adhesive thin-film layer that is used in the micro passage chip of the present invention. First, in step (a), a mask 20 is provided; it has a pattern formed on it that corresponds to the planar shape of the non-adhesive thin-film layer to be formed. The mask may be formed of a synthetic resin film (e.g., PET film or vinyl chloride film) or metal foil with a thickness of about 0.01 mm to 1 mm. Therefore, by punching the film or metal foil through a mold die, or cutting them with a cutting tool, or performing electrical discharge machining with a laser, or machining by milling, a mask having a desired through-pattern can be manufactured. In step (b), the mask 20 is attached to the upper side of a base material (such as PDMS) that should serve as the upper substrate 3 or the lower substrate 5, either by utilizing a phenomenon such as adsorption or by adhesion. In step (c), the assembly is treated by an apparatus for plasma discharge treatment in the presence of a reactive organofluorinated compound (e.g., trifluoromethane ($CHF_3$)) to thereby coat the upper substrate 3 or the lower substrate 5 with a thin fluorocarbon film in a pattern that corresponds to the desired planar shape of the non-adhesive thin-film layer. In step (d), the mask 20 is stripped, whereupon a fluorocarbon-made, non-adhesive thin-film layer is left behind in a desired shape of pattern as it is fastened to the surface of the upper substrate 3 or the lower substrate 5. Alternatively, a common commercially available waterproof spray made of a silicone acrylic resin based water repellant is dusted or otherwise applied from above the mask 20 so that the upper substrate 3 or the lower substrate 5 is coated with the silicone acrylic resin based water repellant in a pattern that corresponds to the planar shape of the non-adhesive thin-film layer to be formed, whereby the non-adhesive thin-film layer 11 or 12 made of the silicone acrylic resin based water repellant can be formed.

If desired, the non-adhesive thin-film layer for a channel 11 and the non-adhesive thin-film layer for squeezing 12 may be provided on the intermediate substrate 8. For instance, the non-adhesive thin-film layer for a channel 11 may be provided on the upper side of the intermediate substrate 8 and the non-adhesive thin-film layer for squeezing 12 on the lower side of the intermediate substrate 8, and yet the same advantage as described above is exhibited. By thusly providing the non-adhesive thin-film layer for a channel 11 and the non-adhesive thin-film layer for squeezing 12 on the opposite sides of the intermediate substrate 8, the trouble of assuring registry that is required when positioning the non-adhesive thin-film layer for a channel 11 on the upper substrate 3 and the non-adhesive thin-film layer for squeezing 12 on the lower substrate 5 can be eliminated.

If desired, it is also possible to provide each of the non-adhesive thin-film layer for a channel 11 and the non-adhesive thin-film layer for squeezing 12 in specified areas of the upper substrate 3, the lower substrate 5 and the intermediate substrate 8. In this case, the non-adhesiveness of the upper substrate to the intermediate substrate can be rendered more positive and so can be the non-adhesiveness of the lower substrate to the intermediate substrate, with the resulting advantage that the parts that correspond to the non-adhesive thin-film layer for a channel 11 and the non-adhesive thin-film layer for squeezing 12 will inflate even more easily upon application of a positive pressure.

Figure 4:
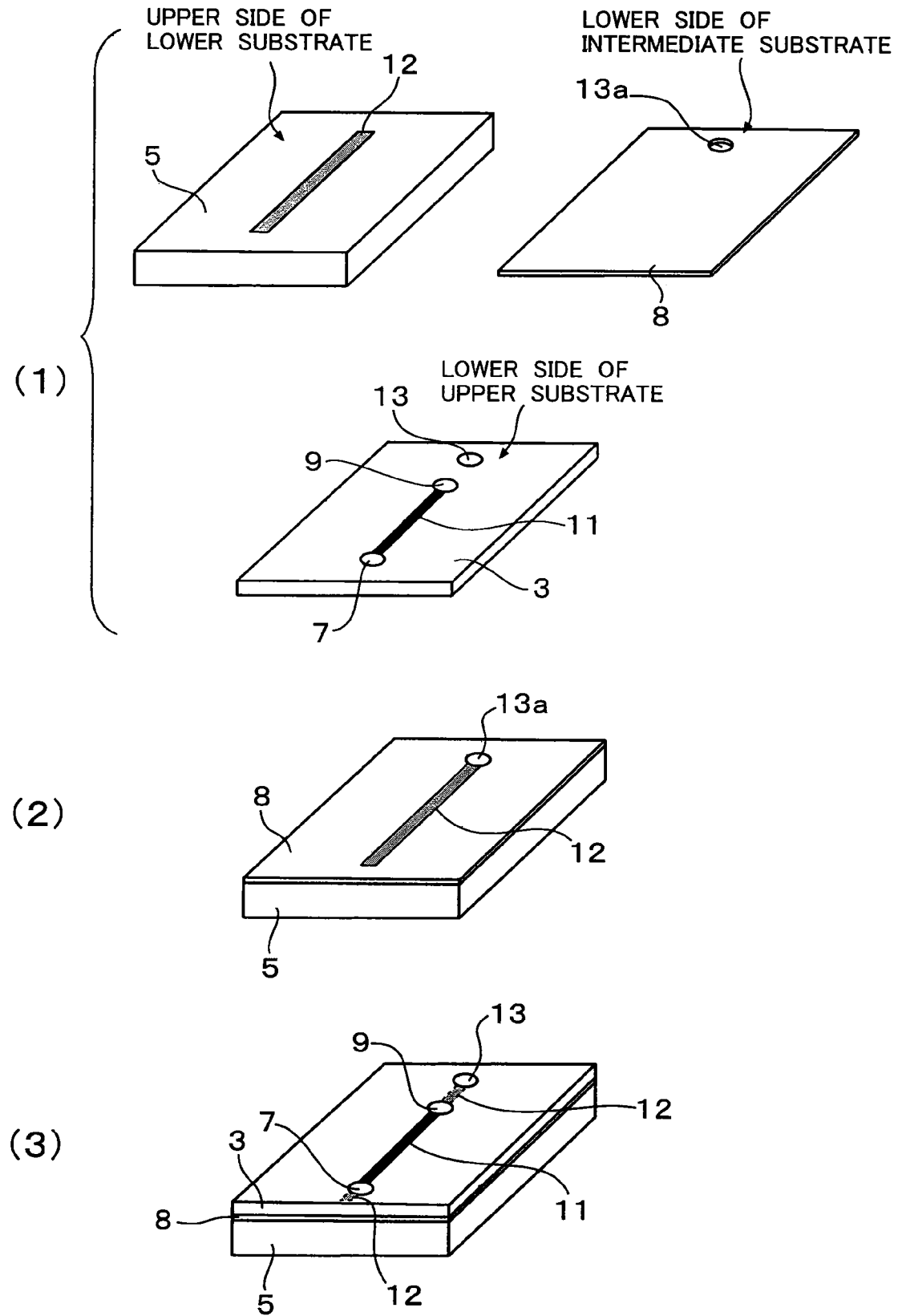
FIG. 4 is a set of exploded perspective views showing the micro passage chip 1A shown in FIGS. 1A and 1B.

FIG. 4 is a set of exploded perspective views showing the micro passage chip 1A shown in FIGS. 1A and 1B. First, in step (1), the upper substrate 3, the lower substrate 5 and the intermediate substrate 8 are provided in preparation for constructing the micro passage chip 1A. The upper substrate 3 and the lower substrate 5 are preliminarily treated by the method depicted in FIG. 3 to form respective non-adhesive thin-film layers. The upper side of the lower substrate 5 has the non-adhesive thin-film layer for squeezing 12 provided in a specified area to cover a specified width and length. The intermediate substrate 8 has a through-hole 13a provided in a specified area. In addition, the lower side of the upper substrate 3 has the non-adhesive thin-film layer for a channel 11 provided in a specified area to cover a specified width and length; it also has ports 7 and 9 provided as through-holes in such a way that they communicate with the opposite ends of the non-adhesive thin-film layer for a channel 11; there is also a through-hole 13 that is provided in the position that corresponds to the through-hole 13a in the intermediate substrate 7 to serve as a pressurizing port. If necessary, the upper side of the lower substrate 5, both sides of the intermediate substrate 8, and the lower side of the upper substrate 3 may be treated for surface modification. By treatment for surface modification, the respective substrates can be adhered to each other with greater strength. As a treatment for surface modification, the oxygen plasma treatment, excimer UV light irradiation or the like can be employed. The oxygen plasma treatment can be performed in the presence of oxygen by means of an apparatus for plasma discharge treatment. Excimer UV light irradiation can be performed in the air at one atmosphere using a dielectric barrier discharge lamp, so it has the advantage of low treatment cost. Next, in step (2), the lower side of the intermediate substrate 8 is attached to the upper side of the lower substrate 5. Finally, in step (3), the lower side of the upper substrate 3 is attached to the upper side of the intermediate substrate 8, whereupon the micro-channel chip 1A is completed.

FIG. 5 is an outline sectional view showing another embodiment of the micro passage chip used to implement the fluid transferring method of the present invention. This micro passage chip 1B differs from the micro passage chip 1A of FIG. 1 in that the first non-adhesive thin-film layer (non-adhesive thin-film layer for a channel) 11 is replaced by a hollow, concave channel 15 that is formed on that side of the upper substrate 3B which is the interface with the intermediate substrate 8, typically by the conventional photolithographic technique. This concave channel 15 is used as a channel through which a liquid is transferred. Provided in one end portion of the concave channel 15 to communicate with it is a port 7 that is open to the outer surface of the upper substrate 3B, and in addition, a port 9 that is open to the outer surface of the upper substrate 3B is provided halfway of the concave channel 15 to communicate with it. As with the micro passage chip 1A, the upper side of the lower substrate 5 has a non-adhesive thin-film layer for squeezing 12 (a second non-adhesive thin-film layer) provided in a specified area to cover a specified width and length. While the non-adhesive thin-film layer for squeezing 12 is fastened to the upper side of the lower substrate 5, the interface between the non-adhesive thin-film layer for squeezing 12 and the intermediate substrate 8 is maintained in a non-adhesive state. This non-adhesive part is called the second non-adhesive part. As will be described later in detail, the second non-adhesive part should serve as a squeezing means for transferring a fluid. One end of the non-adhesive thin-film layer for squeezing 12 is connected to a pressurizing port 13 that is open to the outer surface of the upper substrate 3. The pressurizing port 13 may also be provided in such a way that it is open to the outer surface of the lower substrate 5. If desired, the pressurizing port 13 may be provided halfway, rather than in an end portion, of the non-adhesive thin-film layer for squeezing 12. The non-adhesive thin-film layer for squeezing 12 may be as long as the concave channel 15 or it may be shorter or longer than the latter. Thus, the length of the non-adhesive thin-film layer for squeezing 12 may be selected as appropriate for its use. What is important in the present invention is that the non-adhesive thin-film layer for squeezing 12 should be provided in such a way that it lies either above or under the concave channel 15, with the intermediate substrate 8 lying in between. Unless the non-adhesive thin-film layer for squeezing 12 is provided in such a way that it lies either above or under the concave channel 15, with the intermediate substrate 8 lying in between, the intermediate substrate 8 in the area that corresponds to the second non-adhesive part in the area where the non-adhesive thin-film layer for squeezing 12 is present will not be able to inflate to perform the transfer-by-squeeze function; for details, see below. Other possible modes are such that the entire portion of the non-adhesive thin-film layer for squeezing 12 lies either above or under the concave channel 15 or that only a portion of the non-adhesive thin-film layer for squeezing 12 lies either above or under the concave channel 15. When pressure is exerted through the pressurizing port 13, that part of the intermediate substrate 8 which corresponds to the second non-adhesive part at the interface between the non-adhesive thin-film layer for squeezing 12 and the intermediate substrate inflates to form a space having a certain capacity, but before the pressurization, the second non-adhesive part at the interface between the non-adhesive thin-film layer for squeezing 12 and the intermediate substrate 8 has no capacity.

FIG. 6 is a set of outline sectional views showing the principle of transferring a fluid using the micro passage chip 1B shown in FIG. 5. First, as shown in FIG. 6A, a fluid, say, a liquid 18 is injected through the port 9. The interior of the concave channel 15 is progressively filled with the liquid 18. Then, as shown in FIG. 6B, pressure is applied through the pressurizing port 13 by means of a gas or liquid, whereupon the intermediate substrate 8 at the non-adhesive interface (the second non-adhesive part) between the non-adhesive thin-film layer for squeezing 12 and the intermediate substrate 8 begins to inflate like a balloon along the sidewall surface of the concave channel 15. By controlling the pressure being applied through the pressurizing port 13, the degree of inflation of the intermediate substrate 8 can be controlled and so can be the amount in which the liquid 18 overflows the port 7. Therefore, the micro passage chip 1B can be used not only for the purpose of fluid transfer but also for weighing purposes. Finally, as shown in FIG. 6C, pressurization is continued through the pressurizing port 13, whereupon the intermediate substrate 13 continues to inflate along the sidewall and ceiling surfaces of the concave channel 15 until all of the liquid 18 within the concave channel 15 is pushed through the port 7, whereupon its transfer is complete. Thus, with the micro passage chip 1B, controlled fluid transfer can be implemented.

Figure 7:
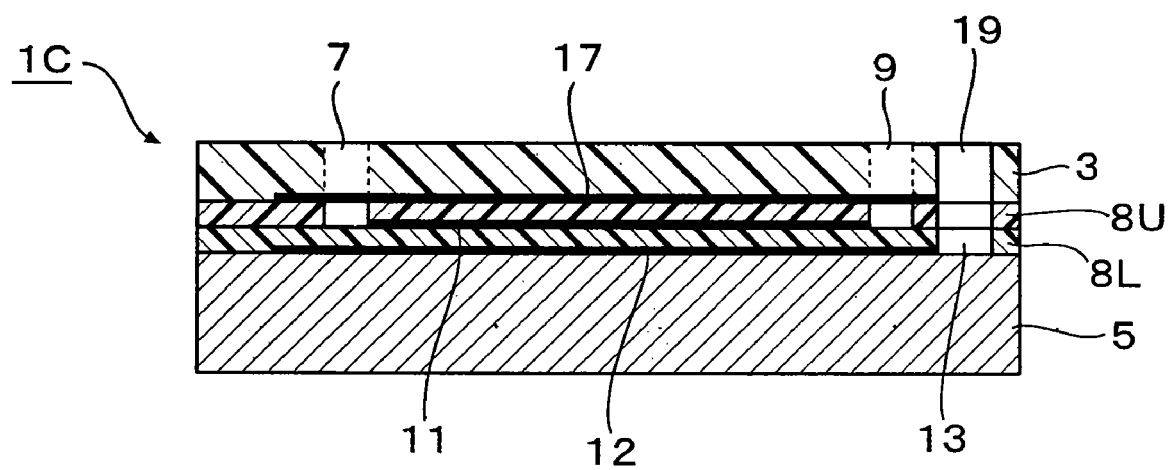
FIG. 7 is an outline sectional view showing yet another embodiment of the micro passage chip used to implement the fluid transferring method of the present invention.

FIG. 7 is an outline sectional view showing yet another embodiment of the micro passage chip used to implement the fluid transferring method of the present invention. The micro passage chip 1C differs from the micro passage chip 1A of FIG. 1 in that two intermediate substrates, the first and second ones, are interposed between the upper substrate 3 and the lower substrate 5. The micro passage chip 1C is characterized in that the non-adhesive thin-film layer for a channel is sandwiched between two non-adhesive thin-film layers for squeezing, one above and the other beneath. For the sake of convenience in explanation, the first intermediate substrate shall be called an upper intermediate substrate 8U and the second intermediate substrate, a lower intermediate substrate 8L. The first non-adhesive thin-film layer 11 which serves as the non-adhesive thin-film layer for a channel is formed on either the lower side of the upper intermediate substrate 8U or the upper side of the lower intermediate substrate 8L or both. The opposite ends of the non-adhesive thin-film layer for a channel 11 are connected to ports 7 and 9 that penetrate the upper substrate 3 and the upper intermediate substrate 8U. The second non-adhesive thin-film layer 12 which serves as the first non-adhesive thin-film layer for squeezing is formed on either the upper side of the lower substrate 5 or the lower side of the lower intermediate substrate 8L or both. A first pressurizing port 13 that is open to the upper surface of the upper substrate 3 is connected to at least one site on the second non-adhesive thin-film layer 12 which serves as the first non-adhesive thin-film layer for squeezing. The third non-adhesive thin-film layer 17 which serves as the second non-adhesive thin-film layer for squeezing is formed on either the lower side of the upper substrate 3 or the upper side of the upper intermediate substrate 8U or both. A second pressurizing port 19 that is open to the upper surface of the upper substrate 3 is connected to at least one site on the third non-adhesive thin-film layer 17 which serves as the second non-adhesive thin-film layer for squeezing. The position where the second pressurizing port 19 is provided shall be such that it does not overlap the first pressurizing port 13. The first pressurizing port 13 and the second pressurizing port 19 may also be provided in such a way that they are open to the outer surface of the lower substrate 5.

Figure 8:
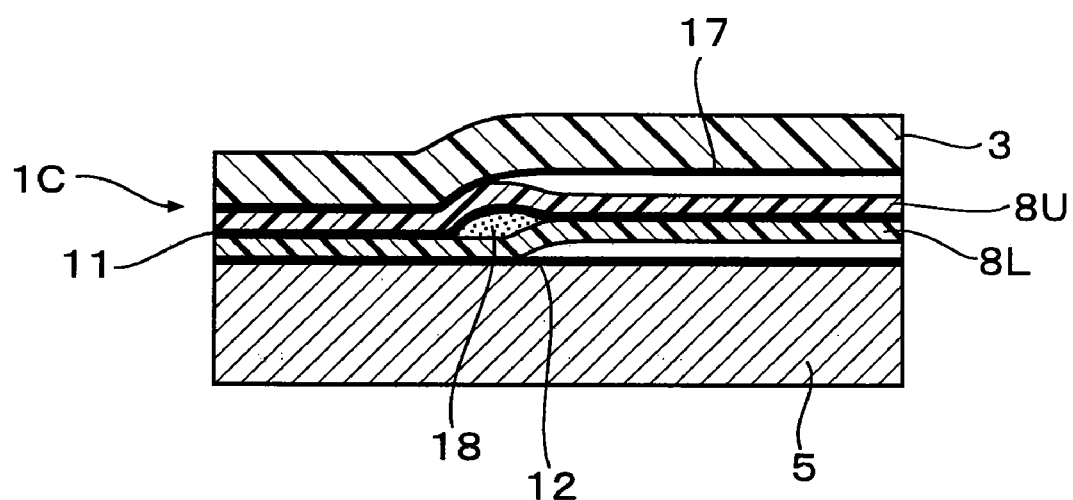
FIG. 8 is an outline sectional view showing the principle of transferring a fluid using the micro passage chip 1C shown in FIG. 7.
Figure 10A:
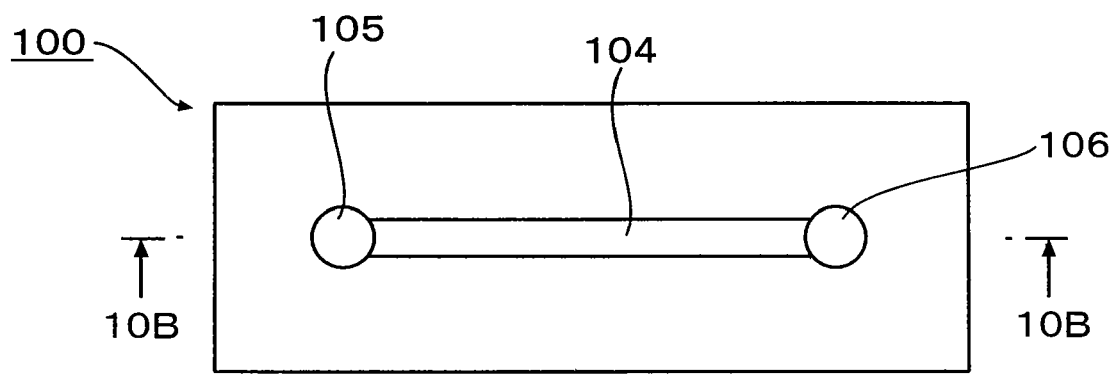
FIG. 10A is an outline plan view showing an example of the conventional micro-channel chip.
Figure 10B:
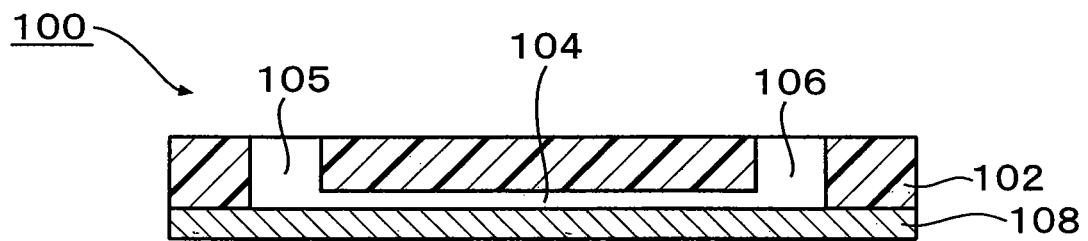
FIG. 10B is a sectional view taken through FIG. 10A along line 10B-10B.

FIG. 8 is an outline sectional view showing the principle of transferring a fluid using the micro passage chip 1C shown in FIG. 7. The liquid 18 injected into the gap formed in the first non-adhesive part which corresponds to the first non-adhesive thin-film layer 11 at the interface between the upper intermediate substrate 8U and the lower intermediate substrate 8L advances in a specified direction as it is squeezed by the inflating nose that has occurred in the second non-adhesive part which corresponds to the second non-adhesive thin-film layer 12 at the interface between the lower substrate 5 and the lower intermediate substrate 8L. On this occasion, the third non-adhesive part which corresponds to the third non-adhesive thin-film layer 17 at the interface between the upper substrate 3 and the upper intermediate substrate 8U may also be inflated so that the liquid 18 is transferred by the squeezing action of the two inflating noses. In an alternative mode of transfer by squeezing, only the second non-adhesive part which corresponds to the second non-adhesive thin-film layer 12 at the interface between the lower substrate 5 and the lower intermediate substrate 8L is inflated but the third non-adhesive part which corresponds to the third non-adhesive thin-film layer 17 at the interface between the upper substrate 3 and the upper intermediate substrate 8U is not inflated, or vice versa, and various other modes of transfer by squeezing may be implemented. If desired, either the second non-adhesive part which corresponds to the second non-adhesive thin-film layer 12 at the interface between the lower substrate 5 and the lower intermediate substrate 8L is inflated or the third non-adhesive part which corresponds to the third non-adhesive thin-film layer 17 at the interface between the upper substrate 3 and the upper intermediate substrate 8U may be inflated so that it functions as a valve for opening or closing the gap formed in the non-adhesive part that corresponds to the first non-adhesive thin-film layer 11 at the interface between the upper intermediate substrate 8U and the lower intermediate substrate 8L. Thus, with the micro passage chip 1C shown in FIG. 7, fluid transfer can be performed in extremely complicated ways including its advancing, retracting and stopping.

FIG. 9 is a set of plan views showing exemplary layouts of the first non-adhesive thin-film layer 11, the second non-adhesive thin-film layer 12, and the third non-adhesive thin-film layer 17 in the micro passage chip 1C shown in FIG. 7. FIG. 9A shows the layout of the third non-adhesive thin-film layer 17 at the interface between the upper substrate 3 and the upper intermediate substrate 8U, FIG. 9B shows the layout of the first non-adhesive thin-film layer 171 at the interface between the upper intermediate substrate 8U and the lower intermediate substrate 8L, FIG. 9C shows the layout of the second non-adhesive thin-film layer 12 at the interface between the lower substrate 5 and the lower intermediate substrate 8L, and FIG. 9D shows these three non-adhesive thin-film layers combined together. As shown, the second non-adhesive thin-film layer 12 and the third non-adhesive thin-film layer 17 independently overlap in some areas with the first non-adhesive thin-film layer 11 but in other areas the first non-adhesive thin-film layer 11 is sandwiched between the second non-adhesive thin-film layer 12 and the third non-adhesive thin-film layer 17, one above and the other beneath. This difference is based on the aforementioned differences in object, such as whether the non-adhesive thin-film layers are used for squeezing or as a valve. In the embodiment under consideration, the first non-adhesive thin-film layer 11 has five ports 9-1 to 9-5 through which the fluid is injected, as well as two ports 7-1 and 7-2 through which the fluid is withdrawn. Numeral 6 indicates an enlarged region in the first non-adhesive thin-film layer 11. This enlarged region 6 is utilized as a vessel in which fluids transferred by squeezing through the respective inlet ports are mixed under agitation. The layout is such that when the fluids injected through the ports 9-1 to 9-5 are sequentially transferred by squeezing into the mixing/agitating vessel 6, either one overlying or underlying squeezing gap is responsible for fluid transfer to the site at which the channel formed by the first non-adhesive thin-film layer 11 divides into branches. Because of this layout, the fluid within in the channel formed by the first non-adhesive thin-film layer 11 can be transferred in a desired direction. In addition, by providing squeezing gaps, one overlying and the other underlying, so that they hold the first non-adhesive thin-film layer 11 between themselves, the fluid within the channel formed by the first non-adhesive thin-film layer 11 can be transferred without interruption even if the squeezing gaps overlap each other when they are provided at the site where the channel formed by the first non-adhesive thin-film layer 11 divides into branches or when they are provided in the middle of a long channel.

EXAMPLE 1

(1) Fabrication of a Micro Passage Chip

According to the flowchart shown in FIG. 4, a micro passage chip 1A was fabricated. First, two masks were prepared by cutting straight scores (feature size, 400 μm) through PET films 0.025 mm thick. One of the masks was intended for the first non-adhesive thin-film layer (the non-adhesive thin-film layer for a channel) 11 and the other mask was intended for the second non-adhesive thin-film layer (the non-adhesive thin-film layer for squeezing) 12; the scores in the mask for the second non-adhesive thin-film layer 12 were longer than those in the mask for the first non-adhesive thin-film layer 11. One of the masks was placed on the lower side of an upper substrate 3 with a thickness of 3 mm that was made of silicone rubber (PDMS) and it was then attached to this silicone-rubber made upper substrate 3 by means of self-adsorption. The other mask was placed on the upper side of a lower substrate 5 with a thickness of 3 mm that was made of silicone rubber (PDMS) and it was then attached to this silicone-rubber made lower substrate 5 by means of self-adsorption. Subsequently, the two assemblies were housed within an apparatus for plasma discharge treatment in a reactive trifluoromethane ($CHF_3$) gas atmosphere and a thin fluorocarbon film was coated from above the masks. After the end of the coating process, the assemblies were taken out of the apparatus for plasma discharge treatment and stripped of the masks. As a result, a thin fluorocarbon film with a thickness not greater than 1 μm that corresponded to the first non-adhesive thin-film layer 11 had been formed on the lower side of the silicone-rubber made upper substrate 3 in a pattern that followed the mask pattern; similarly, a thin fluorocarbon film with a thickness not greater than 1 μm that corresponded to the non-adhesive thin-film layer 12 had been formed on the upper side of the silicone-rubber made lower substrate 5 in a pattern that followed the mask pattern. Holes that should serve as ports 7 and 9 were bored through the upper substrate 3 in the terminal end portions of the first non-adhesive thin-film layer 11; further, a pressurizing port 13 was bored through the upper substrate 3 in a specified area.

Further, the lower side of the silicone-rubber made upper substrate 3 and the upper side of the silicone-rubber made lower substrate 5, as well as the upper and lower sides of a 100 μm thick silicone-rubber made intermediate substrate 8 were subjected to a treatment for surface modification by an oxygen plasma in the apparatus for plasma discharge treatment. Following the treatment for surface modification, the upper side of the silicone-rubber made lower substrate on which the thin patterned fluorocarbon film 12 had been formed was attached to the lower side of the silicone-rubber made intermediate substrate 8 with the through-hole in such a way that the through-hole would connect to an end portion of the thin patterned film 12; further, the lower side of the silicone-rubber made upper substrate 3 was attached to the upper side of the silicone-rubber made intermediate substrate 8 in the assembly in such a way that the thin patterned film 11 would overlap the thin patterned film 12, whereby the silicone-rubber made upper substrate 3, the silicone-rubber made intermediate substrate 8 and the silicone-rubber made lower substrate 5 were permanently bonded to each other. When the lower side of the silicone-rubber made upper substrate 3 was attached to the upper side of the silicone-rubber made intermediate substrate 8, care was taken to ensure that the through-hole in the silicone-rubber made intermediate substrate 8 would be in registry with the pressurizing port 13 in the silicone-rubber made upper substrate 3.

(2) Liquid Transfer Test

In the micro passage chip 1A fabricated in (1) above, the port 7 was charged with 1 μL of the DNA staining solution Cyber Green I and examined for any fluorescence under a microscope. Since there was no DNA available at that time, no fluorescence was observed. The port 9 was charged with 10 μL of a solution of human genome (DNA) in TE and air pressure (positive pressure) was applied to the solution in the port 9 by means of a syringe connected to the through-hole in an adapter. The pressure in the port 9 was gradually increased and at the point in time when it exceeded 50 kPa, the end portion that was closer to the port 9 of the non-adhesive part of the interface between the upper substrate 3 on which the thin patterned fluorocarbon film 11 had been formed and the intermediate substrate 8 started to inflate to generate a gap. The entrance of a small amount of the human genome (DNA) solution into the gap was verified by the inflation of the outer surface of the upper substrate. Thereafter, air pressure (positive pressure) was applied through the pressurizing port 13 by means of a syringe connected to the through-hole in an adapter. The pressure in the pressurizing port 13 was gradually increased and at the point in time when it exceeded 60 kPa, the end portion that was closer to the pressurizing port 13 of the non-adhesive part of the interface between the lower substrate 5 on which the thin patterned fluorocarbon film 12 had been formed and the intermediate substrate 8 started to inflate and it was visually confirmed that the inflating nose advanced toward the port 7. At the point in time when the inflating nose reached the port 7, the liquid in the port 7 was inspected again. Examination under a fluorescence microscope showed the emission of fluorescence from the fluorescent reagent that had intercalated into the DNA. This demonstrated that the liquid in the port 9 could be transferred to the port 7 by the squeezing action that resulted from an inflation of the non-adhesive part of the interface between the lower substrate 5 and the intermediate substrate 8.

EXAMPLE 2

(1) Fabrication of a Micro Passage Chip

According to the flowchart shown in FIG. 4, a micro passage chip 1A was fabricated using the spray coating method. First, two masks were prepared by cutting straight scores (feature size, 400 μm) through PET films 0.025 mm thick. One of the masks was intended for the first non-adhesive thin-film layer (the non-adhesive thin-film layer for a channel) 11 and the other mask was intended for the second non-adhesive thin-film layer (the non-adhesive thin-film layer for squeezing) 12; the scores in the mask for the second non-adhesive thin-film layer 12 were longer than those in the mask for the first non-adhesive thin-film layer 11. One of the masks was placed on the lower side of an upper substrate 3 with a thickness of 3 mm that was made of silicone rubber (PDMS) and it was then attached to this silicone-rubber made upper substrate 3 by means of self-adsorption. The other mask was placed on the upper side of a lower substrate 5 with a thickness of 3 mm that was made of silicone rubber (PDMS) and it was then attached to this silicone-rubber made lower substrate 5 by means of self-adsorption. A common commercially available waterproof spray made of a silicone acrylic resin based water repellant was applied from above the masks. After the end of the spraying, the masks were removed. As a result, a silicone acrylic resin based water repellant coat with a thickness of 1 μm to 5 μm was formed on both the lower side of the silicone-rubber made lower substrate 3 and the upper side of the silicone-rubber made lower substrate 5 in a pattern that followed the mask pattern. This patterned, silicone acrylic resin based water repellant coat is a part that should serve as a non-adhesive thin-film layer. The upper side of the PDMS lower substrate where the patterned, silicone acrylic resin based water repellant coat had formed, the lower side of the PDMS upper substrate where the patterned, silicone acrylic resin based water repellant coat had formed, and both sides of an intermediate substrate were treated for surface modification by an oxygen plasma in an apparatus for plasma discharge treatment. After the treatment, the intermediate substrate was attached to the upper side of the PDMS lower substrate where the patterned, silicone acrylic resin based water repellant coat had formed, and further, the lower side of the silicone-rubber made upper substrate 3 was attached to the upper side of the silicone-rubber made intermediate substrate 8 in the assembly such that the patterned, silicone acrylic resin based water repellant coat 11 would lie over the patterned, silicone acrylic resin based water repellant coat 12, whereby the silicone-rubber made upper substrate 3, the silicone-rubber made intermediate substrate 8 and the silicone-rubber made lower substrate 5 were permanently bonded to each other. When the lower side of the silicone-rubber made upper substrate 3 was attached to the upper side of the silicone-rubber made intermediate substrate 8, care was taken to ensure that the through-hole in the silicone-rubber made intermediate substrate 8 would be in registry with the pressurizing port 13 in the silicone-rubber made upper substrate 3.

(2) Liquid Transfer Test

With the micro passage chip fabricated in (1) above, a test was conducted to see whether a liquid could be transferred from one port to the other. The port 9 was charged with 1 μL of the DNA staining solution Cyber Green I and examined for any fluorescence under a microscope. Since there was no DNA available at that time, no fluorescence was observed. The port 7 was charged with 10 μL of a solution of human genome (DNA) in TE and air pressure (positive pressure) was applied to the solution in the port 7 by means of a syringe connected to the through-hole in an adapter. The applied pressure was gradually increased and at the point in time when it exceeded 50 kPa, the end portion that was closer to the port 9 of the non-adhesive part of the interface between the upper substrate 3 on which the non-adhesive part consisting of the patterned, silicone acrylic resin based water repellant coat 11 had been formed and the intermediate substrate 8 started to inflate to generate a gap. The entrance of a small amount of the human genome (DNA) solution into the gap was verified by the inflation of the outer surface of the upper substrate. Thereafter, air pressure (positive pressure) was applied through the pressurizing port 13 by means of a syringe connected to the through-hole in an adapter. The pressure in the pressurizing port 13 was gradually increased and at the point in time when it exceeded 60 kPa, the end portion that was closer to the pressurizing port 13 of the non-adhesive part of the interface between the lower substrate 5 on which the non-adhesive part consisting of the patterned, silicone acrylic resin based water repellant coat 12 had been formed and the intermediate substrate 8 started to inflate and it was visually confirmed that the inflating nose advanced toward the port 7. At the point in time when the inflating nose reached the port 7, the liquid in the port 7 was inspected again. Examination under a fluorescence microscope showed the emission of fluorescence from the fluorescent reagent that had intercalated into the DNA. This demonstrated that the liquid in the port 9 could be transferred to the port 7 by the squeezing action that resulted from an inflation of the non-adhesive part of the interface between the lower substrate 5 and the intermediate substrate 8.

EXAMPLE 3

(1) Fabrication of a Micro Passage Chip

A micro passage chip of the structure shown in FIG. 1 was fabricated by the printing process. The print side of a known conventional printing OHP (overhead projector) polyester sheet (100 μm thick) was surface modified by the oxygen plasma treatment method; thereafter, the surface-modified side was coated with an aminosilanizing agent so that the print side of the OHP sheet would be amenable to permanent bonding. Subsequently, a desired pattern drawn on a personal computer was printed on the print side of the OHP sheet with a laser printer. The OHP sheet had carbon black and pigments (principal ingredients) printed in thicknesses of 1 μm to 6 μm with a feature size of 800 μm. This OHP sheet was used as the lower substrate 5. The upper substrate 3 and the intermediate substrate 8 were the same as the upper substrate and the intermediate substrate that were used in Example 1. The upper side of the lower substrate (OHP sheet) having the pattern printed as a thin film, the lower side of the upper substrate 3 prepared in Example 1, and both sides of the intermediate substrate were surface modified by the oxygen plasma treatment method. Subsequently, the surface-modified sides were attached together to fabricate the micro passage chip of the present invention.

(2) Fluid Transfer Test

With the micro passage chip fabricated in (1) above, a test was conducted to see whether a liquid could be transferred from one port to the other, using the same method as described in Example 1. As a result, it was verified that the test solution could be transferred from the port 9 to the port 7. This demonstrated that the liquid in the port 9 could be transferred to the port 7 by the squeezing action that resulted from an inflation of the non-adhesive part of the interface between the lower substrate 5 and the intermediate substrate 8 that consisted of the second non-adhesive thin-film pattern formed by the printing process.

EXAMPLE 4

(1) Fabrication of a Micro Passage Chip

Micro passage chip 1B of the structure illustrated in FIG. 5 was fabricated. First, the lower side of an upper substrate 3 with a thickness of 3 mm that was made of silicone rubber (PDMS) was processed by a conventional photolithographic technique to form a concave channel 15 that was 400 μm wide and 100 μm deep. A port 7 communicating with one end portion of this concave channel was bored through the substrate from its outer side, and a port 9 also communicating with the concave channel was pored through the substrate from its outer side in a position that was slightly away from the other end portion of the concave channel toward the port 7. In accordance with the method described in Example 1 above, the second non-adhesive thin-film layer with a feature size of 400 μm was formed of a thin fluorocarbon film on the upper side of the lower substrate 5. Both sides of a silicone-rubber made intermediate substrate 8 with a thickens of 50 μm, the lower side of the upper substrate 3 and the upper side of the lower substrate 5 were treated for surface modification by an oxygen plasma in an apparatus for plasma discharge treatment. After the surface modification treatment, the lower substrate 5, the intermediate substrate 8 and the upper substrate 3 were assembled together to fabricate the micro passage chip 1B shown in FIG. 5

(2) Fluid Transfer Test

With the micro passage chip 1B fabricated in (1) above, a test was conducted to see whether a liquid could be transferred from one port to the other. Red-colored water in a volume equivalent to a third of the total capacity of the concave channel 15 was injected through the port 9. At that point in time, no part of the red water was found to have reached the port 7. Subsequently, a positive pressure was gradually applied through the pressurizing port 13 and at the point in time when it exceeded 60 kPa, the non-adhesive part of the intermediate substrate 8 that corresponded to the position of the second non-adhesive thin-film layer 12 on the lower substrate 5 began to inflate into a balloon shape. At that point in time, the pressure being applied was controlled and the behavior of the red water in the concave channel 15 was observed. At the point in time when the applied pressure was about 70 kPa, the red water began to overflow the port 7. The applied pressure was further increased and at the point in time when it was about 90 kPa, almost all of the red water injected into the concave channel 15 through the port 9 was recovered through the port 7. This result verified that even in a micro passage chip having the conventional concave channel, the transfer-by-squeeze mechanism that depends on inflating the non-adhesive part of the intermediate substrate that consists of a non-adhesive thin-film layer is useful.

EXAMPLE 5

(1) Fabrication of a Micro Passage Chip

A micro passage chip 1B of the structure illustrated in FIG. 7 was fabricated. First, three masks were prepared by cutting straight scores (feature size, 400 μm) through PET films 0.025 mm thick. The first mask was intended for the first non-adhesive thin-film layer (the non-adhesive thin-film layer for a channel) 11, the second mask was intended for the second non-adhesive thin-film layer (the first non-adhesive thin-film layer for squeezing) 12, and the third mask was intended for the third non-adhesive thin-film layer (the second non-adhesive thin-film layer for squeezing) 17; the scores in the mask for the second non-adhesive thin-film layer 12 and the mask for the third non-adhesive thin-film layer 17 were longer than those in the mask for the first non-adhesive thin-film layer 11. The first mask was placed on the lower side of an upper intermediate substrate 8U with a thickness of 100 μm that was made of PDMS and it was then attached to this upper intermediate substrate 8U by means of self-adsorption. The second mask was placed on the lower side of an upper substrate 3 with a thickness of 3 mm that was made of PDMS and it was then attached to this upper substrate 3 by means of self-adsorption. The third mask was placed on the upper side of a lower substrate 5 with a thickness of 3 mm that was made of PDMS and it was then attached to this lower substrate 5 by means of self-adsorption. Subsequently, the three assemblies were housed within an apparatus for plasma discharge treatment in a reactive trifluoromethane ($CHF_3$) gas atmosphere and a thin fluorocarbon film was coated from above the masks. After the end of the coating process, the assemblies were taken out of the apparatus for plasma discharge treatment and stripped of the masks. As a result, a thin (1 μm) fluorocarbon film had been formed on the surface of each substrate in a pattern that followed the mask pattern.

Further, a PDMS-made lower intermediate substrate 8L with a thickness of 100 μm was provided and three substrates consisting of this lower intermediate substrate as well as the upper substrate 3 and the lower intermediate substrate 8U were subjected to a treatment for opening through-holes in specified areas. Thereafter, the surface of each substrate was treated for modification by the same method as described in Example 1. After the surface modification treatment, the upper side of the lower substrate 5 on which the thin patterned fluorocarbon film 12 had been formed was attached to the lower side of the lower intermediate substrate 8L with the through-hole in such a way that the through-hole would connect to an end portion of the thin patterned film 12; further, the lower side of the upper intermediate substrate 8U on which the thin patterned film 11 had been formed was attached to the upper side of the lower intermediate substrate 8L in the assembly in such a way that the thin patterned film 11 would overlap the thin-patterned film 12; furthermore, the lower side of the upper substrate 3 on which the thin patterned film 17 had been formed was attached to the upper side of the upper intermediate substrate 8U in such a way that the thin patterned film 11 would overlap the thin-patterned film 17, whereby the respective substrates were permanently bonded to each other.

(2) Fluid Transfer Test

In the micro passage chip 1C fabricated in (1) above, the port 7 was charged with 1 μL of the DNA staining solution Cyber Green I and examined for any fluorescence under a microscope. Since there was no DNA available at that time, no fluorescence was observed. The port 9 was charged with 10 μL of a solution of human genome (DNA) in TE and air pressure (positive pressure) was applied to the solution in the port 9 by means of a syringe connected to the through-hole in an adapter. The pressure in the port 9 was gradually increased and at the point in time when it exceeded 60 kPa, the non-adhesive part of the interface between the upper intermediate substrate 8U on which the thin patterned fluorocarbon film 11 had been formed and the lower intermediate substrate 8L began to inflate, creating a gap. The entrance of a small amount of the human genome (DNA) solution into the gap was verified by the inflation of the outer surface of the upper substrate. Thereafter, air pressure (positive pressure) was applied through the pressurizing port 13 by means of a syringe connected to the through-hole in an adapter. The pressure in the pressurizing port 13 was gradually increased and at the point in time when it exceeded 65 kPa, the end portion that was closer to the pressurizing port 13 of the non-adhesive part of the interface between the lower substrate 5 on which the thin patterned fluorocarbon film 12 had been formed and the lower intermediate substrate 8L started to inflate and it was visually confirmed that the inflating nose advanced toward the port 7. When the pressurization through the pressurizing port 13 was suspended, the transfer of the DNA solution was interrupted. Air pressure (positive pressure) was then applied through the pressurizing port 19. The pressure in the pressurizing port 19 was gradually increased and at the point in time when it exceeded 55 kPa, the end portion that was closer to the pressurizing port 19 of the non-adhesive part of the interface between the upper substrate 3 on which the thin patterned film 17 had been formed and the upper intermediate substrate 8U started to inflate and the inflating nose advanced toward the port 7, whereupon the DNA solution that had stayed between the upper intermediate substrate 8U and the lower intermediate substrate 8L began to move again for transfer toward the port 7. When pressurization through the pressurizing port 13 was resumed, both the inflating nose between the lower substrate 5 and the lower intermediate substrate 8L and the inflating nose between the upper substrate 3 and the upper intermediate substrate 8U eventually reached the port 7 and at that point in time, the liquid in the port 7 was inspected again. Examination under a fluorescence microscope showed the emission of fluorescence from the fluorescent reagent that had intercalated into the DNA. This demonstrated that even with a micro passage chip of a four-layer structure, the fluid in the port 9 could be transferred to an intended area.

INDUSTRIAL APPLICABILITY

While the method of the present invention for transferring fluids by squeezing under pressure has been described above specifically with reference to its preferred embodiments, the present invention is by no means limited to those disclosed embodiments but various improvements and modifications are possible. For instance, three or more intermediate substrates may be interposed or if desired, the upper substrate may be provided with both a zero-capacity channel for fluids as a non-adhesive part that consists of a non-adhesive thin-film layer and a hollow concave channel for fluids.

It should also be noted that the method of the present invention for transferring fluids by squeezing is by no means limited to fluid transfer from one port to another. It can also be used in fluid transfer from one port to any micro-structural elements on another microchip (as exemplified by a micro passage, a reaction vessel, a piezoelectric device, a fluid control device, a metallization pattern, and electrodes). Therefore, non-adhesive thin-film layers can be so provided as to establish communication between the port at the start point and any of such micro-structural elements.

According to the method of the present invention for transferring fluids by squeezing, fluids can be positively transferred by merely adopting a simple pressure applying operation and this contributes to a marked improvement in the practical utility and economy of the method. As a result, the method of the present invention for transferring fluids by squeezing finds effective and advantageous use in various fields including medicine, veterinary medicine, dentistry, pharmacy, life science, foods, agriculture, fishery, and police forensics. In particular, the method of the present invention for transferring fluids by squeezing is optimum for use as a micro passage chip in the fluorescent antibody technique, in-situ hybridization and the like, and it can be used inexpensively in a broad range of areas including testing for immunological diseases, cell culture, virus fixation, pathological test, cytological diagnosis, biopsy tissue diagnosis, blood test, bacteriologic examination, protein analysis, DNA analysis, and RNA analysis.

The invention claimed is:

1. A micro passage chip comprising at least a first substrate of an elastic material, a second substrate, and an intermediate substrate of an elastic material interposed between the first substrate and the second substrate, further comprising:
   a first non-adhesive thin-film layer is formed on at least one of the mating sides of the first substrate and the intermediate substrate and at least one port for fluids that is in contact with the first non-adhesive thin-film layer and which is open to the outer surface of the first substrate is provided in any position on the first non-adhesive thin-film layer,
a second non-adhesive thin-film layer whose length is either the same as or different from that of the first non-adhesive thin-film layer is formed on at least one of the mating sides of the second substrate and the intermediate substrate such that it lies either above or under the first non-adhesive thin-film layer, and parallel thereto, with the intermediate substrate lying in between, and
a pressurizing port that is in contact with the second non-adhesive thin-film layer and which is open to the outer surface of the first or the second substrate is provided in at least one area on the second non-adhesive thin-film layer;
a first non-adhesive part disposed in an interface area between the first substrate and the intermediate substrate where the first non-adhesive thin-film layer is formed;
a second non-adhesive part disposed in a second interface area between the second substrate and the intermediate substrate where the second non-adhesive thin-film layer is formed;
wherein under a non-pressure state at the pressurizing port, both the first non-adhesive part and the second non-adhesive part have no capacity, and
wherein under a positive pressure state at the pressurizing port, the first substrate corresponding to the first non-adhesive part deforms to form a channel for the fluids, and the intermediate substrate corresponding to the second non-adhesive part deforms to form a microchannel adapted to squeeze the fluids through the channel.

2. The micro passage chip according to claim 1, wherein the first non-adhesive thin-film layer includes, halfway down it, at least one enlarged region layer having at least one planar shape selected from the group consisting of a circular, an elliptical, a rectangular, and a polygonal shape.

3. The micro passage chip according to claim 1, wherein the first non-adhesive thin-film layer and the second non-adhesive thin-film layer each have a film thickness in the range of 10 nm to 300 μm and a width in the range of 10 μm to 3000 μm.

4. A micro passage chip comprising at least a first substrate, a second substrate, and an intermediate substrate, of an elastic material, interposed between the first substrate and the second substrate, further comprising:
a hollow, concave channel through which to pass a fluid is formed on the side of the first substrate that is adhered to the intermediate substrate and at least one port for fluids that communicates with the concave channel and which is open to the outer surface of the first substrate is provided at any position in the concave channel,
a second non-adhesive thin-film layer whose length is either the same as or different from that of the concave channel is formed on at least one of the mating sides of the second substrate and the intermediate substrate such that it lies either above or under the concave channel, and parallel thereto, with the intermediate substrate lying in between, and
a pressurizing port that is in contact with the second non-adhesive thin-film layer and which is open to the outer surface of the first or second substrate is provided in at least one area on the second non-adhesive thin-film layer;
a second non-adhesive part disposed in an interface area between the second substrate and the intermediate substrate where the second non-adhesive thin-film layer is formed;
wherein under a non-pressure state at the pressurizing port, the second non-adhesive part has no capacity, and
wherein under a positive pressure state at the pressurizing port, the intermediate substrate corresponding to the second non-adhesive part deforms to form a microchannel adapted to squeeze the fluids through the concave channel.

5. The micro passage chip according to claim 4, wherein the second non-adhesive thin-film layer has a film thickness in the range of 10 nm to 300 μm and a width in the range of 10 μm to 3000 μm.

6. A micro passage chip comprising at least a first substrate, a second substrate, and a first and a second intermediate substrate that are interposed between the first substrate and the second substrate, wherein
a first non-adhesive thin-film layer is formed on at least one of a mating side of the first and the second intermediate substrate and at least one port for fluids that is in contact with the first non-adhesive thin-film layer and which is open to the outer surface of the first substrate is provided in any position on the first non-adhesive thin-film layer,
at least a portion of a second non-adhesive thin-film layer whose length is either the same as or different from that of the first non-adhesive thin-film layer is formed on at least one of the mating sides of the second substrate and the second intermediate substrate such that it lies either above or under the first non-adhesive thin-film layer, with the second intermediate substrate lying in between, and a first pressurizing port that is in contact with the second non-adhesive thin-film layer and which is open to the outer surface of the first or the second substrate is provided in at least one area on the second non-adhesive thin-film layer, and
at least a portion of a third non-adhesive thin-film layer whose length is either the same as or different from that of the first non-adhesive thin-film layer is formed on at least one of the mating sides of the first substrate and the first intermediate substrate such that it lies either above or under the first non-adhesive thin-film layer, with the first intermediate substrate lying in between, and a second pressurizing port that is in contact with the third non-adhesive thin-film layer and which is open to the outer surface of the first or the second substrate is provided in at least one area on the third non-adhesive thin-film layer.

7. The micro passage chip according to claim 6, wherein
a first non-adhesive part is present in the area of the interface between the first and the second intermediate substrate where the first non-adhesive thin-film layer is formed,
a second non-adhesive part is present in the area of the interface between the second substrate and the second intermediate substrate where the second non-adhesive thin-film layer is formed,
a third non-adhesive part is present in the area of the interface between the first substrate and the first intermediate substrate where the third non-adhesive thin-film layer is formed,
the first non-adhesive part serves as a channel for the fluid, and
the second and third non-adhesive parts serve as squeezing means for transferring the fluid.

8. The micro passage chip according to claim 6, wherein the first non-adhesive thin-film layer includes, halfway down it, at least one enlarged region layer having at least one planar shape selected from the group consisting of a circular, an elliptical, a rectangular, and a polygonal shape.

9. The micro passage chip according to claim 6, wherein the first non-adhesive thin-film layer, the second non-adhesive thin-film layer, and the third non-adhesive thin-film layer each have a film thickness in the range of 10 nm to 300 μm and a width in the range of 10 μm to 3000 μm.

10. The micro passage chip according to claim 1, wherein the first substrate is made of polydimethylsiloxane (PDMS), the second substrate is made of polydimethylsiloxane (PDMS) or glass, and the intermediate substrate(s) is(are) made of polydimethylsiloxane (PDMS).

* * * * *